US012720255B2

(12) United States Patent
Thiyagarajan et al.

(10) Patent No.: US 12,720,255 B2
(45) Date of Patent: Aug. 25, 2026

(54) OMNI DIRECTIONAL UNIFIED COMMUNICATIONS SYSTEM TABLETOP AUDIO DEVICE USING TWO OR MORE LOUDSPEAKERS

(71) Applicant: Crestron Electronics, Inc., Rockleigh, NJ (US)

(72) Inventors: Babu Thiyagarajan, Mahwah, NJ (US); Oleg Bogdanov, Toronto (CA); Kian-Mun Kong, Rivervale, NJ (US)

(73) Assignee: Crestron Electronics, Inc., Rockleigh, NJ (US)

(*) Notice: Subject to any disclaimer, the term of this patent is extended or adjusted under 35 U.S.C. 154(b) by 163 days.

(21) Appl. No.: 18/815,121

(22) Filed: Aug. 26, 2024

(65) Prior Publication Data

US 2026/0059234 A1 Feb. 26, 2026

(51) Int. Cl.
*H04R 1/34* (2006.01)
*H04R 1/02* (2006.01)

(52) U.S. Cl.
CPC ............. *H04R 1/345* (2013.01); *H04R 1/025* (2013.01)

(58) Field of Classification Search
CPC ... H04R 1/20; H04R 1/32; H04R 1/02; H04R 1/025; H04R 2201/02; H04R 2201/34; H04R 2201/40
See application file for complete search history.

(56) References Cited

U.S. PATENT DOCUMENTS

2005/0195987 A1* 9/2005 Kim ..................... H04R 1/2857 381/89
2016/0337747 A1* 11/2016 Litovsky .............. H04R 1/2838

OTHER PUBLICATIONS https://www.shure.com/en-US/products/microphones/stem_table?variant=TABLE1.
https://www.sennheiser.com/en-us/product-families/tcisp.
https://www.amazon.com/All-new-Echo-Show-5/dp/B09B2SBHQK/ref=sr_1_1?dib=eyJ2ljoiMSJ9._mb2-m-jSzBFSM-1_COLCAjs0avyqpLZpdp4hsrujCSVJICH07w0R8GlQD05MC_HKhcClhqEFF02VmdLtbP_rRlCA8Q8VVWAUEEuXnznMSliY-GcZl2lLiXQKgWvJ96sgYsEK25q9tZQyh8kMJ8teOwDK-22LqVGKRlLTYPGya-8wO2DkLyl_JZbwO_rt8FJwdW39kzDA7nuE_lZxOVrLbjF1HO-35X14zh3EMRnllY.

* cited by examiner

*Primary Examiner* — Tuan D Nguyen
(74) *Attorney, Agent, or Firm* — Crestron Electronics, Inc.; Mark Hrozenchik

(57) ABSTRACT

An acoustic waveguide for use in a unified communications system conference room audio device is described herein, wherein the acoustic waveguide is a generally shepherds-hook shaped object, comprising: a lower, substantially planar non-acoustic wave interfacing surface; and a concave or convex shaped upper acoustic wave interfacing surface, wherein the concave or convex upper acoustic wave interfacing surface comprises a concave or convex shaped surface with a substantially continuously and linearly changing radius from a lower end to an upper end, and wherein when used with a substantially similar second acoustic waveguide that is similarly positioned within the audio device, but wherein the second acoustic waveguide is a mirrored opposite of the first acoustic waveguide, the combination of the two acoustic waveguides are adapted to generate a substantially uniform sound pressure level and radiation pattern about the audio device when each receive respective acoustic audio waves from respective loudspeakers located at substantially similar heights above the respective acoustic waveguides.

6 Claims, 41 Drawing Sheets

Concave Acoustic Waveguide

FIGS 10-18: Concave Acoustic Waveguide

WAVEGUIDE CONCAVE PROFILE AT LOUDSPEAKER LOCATION

WAVEGUIDE CONCAVE PROFILE AT FRONT END

SECTION V-V
WAVEGUIDE CONCAVE PROFILE AT FRONT END

FIGS 19-27: Convex Acoustic Waveguide

WAVEGUIDE CONVEX PROFILE AT LOUDSPEAKER LOCATION

SECTION V-V
WAVEGUIDE CONVEX PROFILE AT REAR END

Enlarged view of Figure 30,
Front view of Concave AWG
406a

OMNI DIRECTIONAL UNIFIED COMMUNICATIONS SYSTEM TABLETOP AUDIO DEVICE USING TWO OR MORE LOUDSPEAKERS

BACKGROUND OF THE INVENTION

Technical Fields

The embodiments described herein relate generally to unified communications systems conference room loudspeaker and microphone devices (audio device), and more specifically to systems, methods, and modes for broadcasting far end audio that has been received by a near end unified communications system table top combined loudspeaker and microphone device (audio device) in a substantially omnidirectional pattern.

Background Art

Unified communications systems (UCSs) are nearly ubiquitous in enterprise environments (corporations, government entities, educational facilities, among others). As those of skill in the art can appreciate, UCSs provide audio, and often video, conferencing capabilities when the parties are remotely located from each other. Such UCSs typically include a device that provides an audio interface (microphone and loudspeaker (also referred to as a "transducer"), and camera/display if video is involved. Further, some type of processer device is required that can store and operate the UCS software application, as well as provide data communications through a network, such as the Internet, among other types of networks. Many UCSs locate one or more of the processing capabilities, network interface, loudspeaker, and microphone all in one device. Such a device can be referred to as a table top communication device.

At the very least, the table top communication device will include the audio components—loudspeaker and microphone, and perhaps the processing and network interface components. In that case, ideally, table top communication devices should radiate sound equally in all directions, so all persons around a table can hear the sound generated by the device equally well. Such an equally dispersion of sound is referred to as omnidirectional. Many recently available table top UCS audio devices include features such as microphone arrays placed on their top surface, touch screen on their sides, large print circuit boards (PCBs) inside, with connectors and cable management systems at the bottom, which prevent or prohibit central placement of a loudspeaker. The single loudspeaker is therefore placed on one side or the other, and consequently points in a direction which provides adequate sound projection in one direction only. Such a single loudspeaker placement in such a device results in unsatisfactory result with the sound blocked in wide sectors around the table top device.

Accordingly, a need has arisen for systems, methods, and modes for broadcasting far end audio that has been received by a near end unified communications system table top combined loudspeaker and microphone device (audio device) in a substantially omnidirectional pattern.

SUMMARY

It is an object of the embodiments to substantially solve at least the problems and/or disadvantages discussed above, and to provide at least one or more of the advantages described below.

It is therefore a general aspect of the embodiments to provide systems, methods, and modes for broadcasting far end audio that has been received by a near end unified communications system table top combined loudspeaker and microphone device (audio device) in a substantially omnidirectional pattern that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to a first aspect of the embodiments, an acoustic waveguide for use in a unified communications system conference room audio device is provided, wherein the acoustic waveguide is a generally shepherds-hook shaped object, comprising: a lower, substantially planar non-acoustic wave interfacing surface; a first portion inner side wall; an inner side wall curved portion; a second portion inner side wall; an upper side wall; a non-curved exterior side wall portion; a curved exterior side wall portion; a lower side wall, and wherein each of the non-curved exterior side wall portion, curved exterior side wall portion and lower side wall and are substantially equal in height; an apex point, located on an exterior surface of the outer side wall curved portion, and furthest away from the lower side wall; a loudspeaker placement location, located farther away from the lower side wall than from the apex; and a concave upper acoustic wave interfacing surface, wherein the concave upper acoustic wave interfacing surface comprises a concave shaped surface with a substantially continuously and linearly changing radius, with a substantially horizontal surface at an interface with the lower side wall, and as the upper acoustic wave interfacing surface progresses from the lower side wall, the upper acoustic wave interfacing surface changes such that the concave radii reaches a maximum first radius at about a center of a curved portion of the shepherds-hook shaped acoustic wave-guide, and then the radius of the upper acoustic wave interfacing surface decreases in radius from the maximum at about the center of the curved portion to a second radius at an interface with the upper side wall.

According to the first aspect of the embodiments, when used with a substantially similar second acoustic waveguide that is similarly positioned within the audio device, but wherein the interior facing side wall of the second acoustic waveguide faces the interior facing side wall of the first acoustic waveguide, the combination of the two acoustic waveguides are adapted to generate a substantially uniform sound pressure level and radiation pattern about the audio device when each receive respective acoustic audio waves from respective loudspeakers located at substantially similar heights above the respective acoustic waveguides at their respective loudspeaker placement location.

According to the first aspect of the embodiments, each of the respective fixed loudspeaker locations are located at a first distance from the lower side wall and a second distance from the apex, and wherein the first distance is greater than the second distance, and further wherein each respective loudspeaker is located at a first, fixed height above its respective concave upper acoustic wave interfacing surface of the acoustic waveguide.

According to the first aspect of the embodiments, each respective loudspeaker is located substantially equidistant between the non-curved exterior side wall portion and the first portion inner side wall.

According to the first aspect of the embodiments, the height of the first portion inner side wall increases substantially linearly from a first height at the interface with the lower side wall to a second, maximum height at about a center of a hook portion of the shepherds hook shaped acoustic wave-guide, and further wherein the height of the inner wall decreases substantially linearly from the maximum, second height to a third height at an interface of the second portion inner wall with the upper side wall.

According to the first aspect of the embodiments, the first and second acoustic waveguides are further adapted to substantially minimize comb filtering between reflected audio waves from each of the first and second acoustic waveguides.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

DETAILED DESCRIPTION

Figure 1:
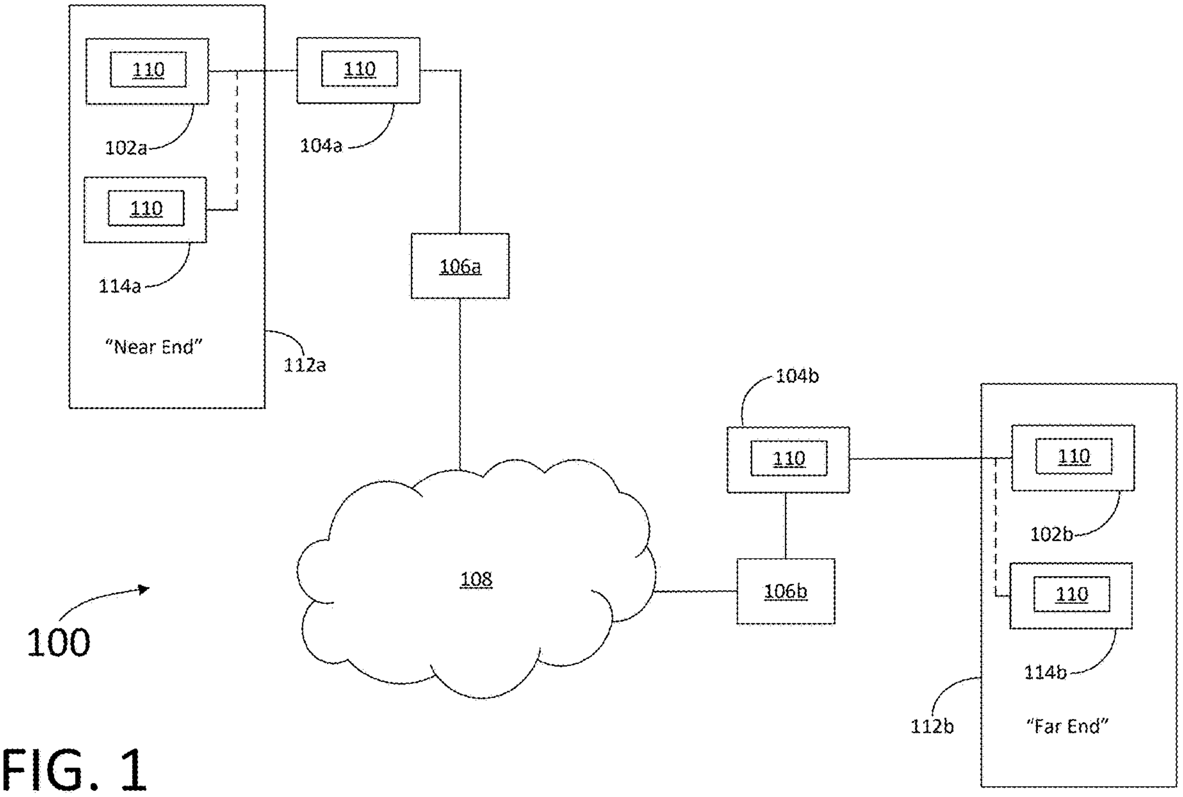
FIG. 1 illustrates a simplified block diagram of a unified communications system (UCS) that includes a near-end and a far-end conference room capable of communicating through the unified communications system according to aspects of the embodiments.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of company that designs, manufactures, markets, and sells home and business audio/video (A/V) distribution systems, home and business environmental, lighting, shades, and security systems, and A/V teleconferencing systems (e.g., unified communications systems), so it is to be understood that generally the concepts discussed herein are applicable to various subsystems and not limited to only a particular device or class of devices, such as loudspeakers, but more particularly to systems, methods, and modes for broadcasting far end audio into a near end unified communications conference room audio system in a substantially omnidirectional pattern through a combined microphone loudspeaker device for use with any and all of the above discussed systems.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

Table 1—List of Reference Numbers

100 Unified Communications System

102 Unified Communications System Table Top Combined Loudspeaker and Microphone Device with Convex Acoustic Waveguide 406 (Audio Device)

104 Server

106 Internet Service Provider (ISP)
108 Internet
110 Unified Communications Systems Operating Software/Application (UCS App 110)
112 Conference Room
114 Audio Device with Concave Acoustic Waveguide 1004
202 Top Cover
204 Loudspeaker Box
206 Body/Housing
208 Base Grill
210 Base with Concave Acoustic Waveguide (Base)
212 Printed Circuit Board (PCB)
402 Transducer (Loudspeaker)
404 Sound Wave/Acoustic Energy
406 Convex Acoustic Waveguide
502 Center Axis
602 Audio Device
604 Loudspeaker Box
800 Sound Radiation Diagram
802 First Sound Radiation Pattern with a First Loudspeaker Operating (First Sound Radiation Pattern)
804 Sound Radiation Pattern with a First and Second Loudspeaker Operating (Second Sound Radiation Pattern)
1002 Internal Mounting Structure
1004 Concave Acoustic Waveguide
1900 Base with Convex Acoustic Waveguide
2802 Lower Side Wall
2804 First Portion Inner Side Wall
2806 Inner Side Wall Curved Portion
2808 Second Portion Inner Side Wall
2810 Upper Side Wall
2812 Upper Acoustic Wave Interfacing Surface of Concave Acoustic Waveguide (Concave AWG Upper Surface)
2814 Non-curved Exterior Side Wall Portion
2816 Curved Exterior Side Wall Portion
2818 Apex
2820 Substantially Planar Lower Non-Acoustic Wave Interfacing Surface
3202 Lower Side Wall
3204 First Portion Inner Side Wall
3206 Inner Side Wall Curved Portion
3208 Second Portion Inner Side Wall
3210 Upper Side Wall
3212 Upper Acoustic Wave Interfacing Surface of Convex Acoustic Waveguide (Upper Surface)
3214 Non-curved Exterior Side Wall Portion
3216 Curved Exterior Side Wall Portion
3218 Apex
3220 Substantially Planar Lower Non-Acoustic Wave Interfacing Surface
3702 Centerline
3704 Microphone (Mic)
3706 Spectrum Analyzer
3802 Substantially Flat Surface
4102 Concave Acoustic Waveguide Upper Surface
4104 Convex Acoustic Waveguide Upper Surface
4106 Segmented Concave Acoustic Waveguide Upper Surface
4108 Segmented Convex Acoustic Waveguide Upper Surface
4110 Linear Acoustic Waveguide Upper Surface The following is a list of the acronyms used in the specification in alphabetical order.

Table 2—List of Acronyms

A/V Audio-Video
App Application
AWG Acoustic Waveguide
ISP Internet Service Provider
PCB Printed Circuit Board
SPL Sound Pressure Level
UCS Unified Communication System The different aspects of the embodiments described herein pertain to the context of systems, methods, and modes for broadcasting far end audio that has been received by a near end unified communications system table top combined loudspeaker and microphone device (audio device) in a substantially omnidirectional pattern, but is not limited thereto, except as may be set forth expressly in the appended claims.

Crestron Electronics Inc. is one of the world's leading manufacturers of control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes for broadcasting far end audio that has been received by a near end unified communications system table top combined loudspeaker and microphone device (audio device) in a substantially omnidirectional pattern, can be used in a table top communication device that can be manufactured by Crestron Electronics Inc., located in Rockleigh, NJ, and have been marketed and sold under the registered trademark name of NextGenerationMercury®.

FIG. 1 illustrates a simplified block diagram of unified communications system (UCS) 100 that includes a near-end and a far-end conference room 112*a, b* capable of communicating through UCS 100 according to aspects of the embodiments.

UCS 100 of FIG. 1 includes near-end conference room 112*a* and far-end conference room 112*b*, wherein occupants of both conference rooms 112*a, b* can communicate with each other through UCS 100 and its devices, as well as through use of internet 108 according to aspects of the embodiments. As shown in FIG. 1, first conference room 112*a* has been labelled "near end" and second conference room 112*b* has been labelled "far end." As those of skill in the art can appreciate, such labels are interchangeable, and depend on one's reference point, and are included to simply the discussion and help to make the discussion easier to understand.

Shown in FIG. 1 are unified communications system table top combined loudspeaker and microphone device (audio device) 102, as well as audio device 114. Audio device 102*a* of first "near end" conference room 112*a* interfaces with first local server 104*a* that connects to internet 108 through first Internet service provider (ISP) 106*a*. Similarly, audio device 102*b* of second "far end" conference room 112*b* interfaces with second local server 104*b* that also connects to internet 108 through second ISP 06*b* (though ISPs 106*a, b* can be the same ISP). Audio devices 102, 114 are substantially similar, except that audio device 102 includes convex acoustic waveguide (AWG) 406, which is described in greater detail below, and audio device 114 includes concave AWG 1004, which also is described in greater detail below. Both audio devices 102, 114 are substantially similar in terms of functionality, use, and performance and therefore, in fulfillment of the dual purposes of clarity and brevity, reference shall only be made to audio device 102 in the discussion of FIG. 1.

As those of skill in the art can appreciate, UCSs 100 operate through the use of software (which can also be referred to as applications (App)). The software used to operate UCS 100 can be referred to as UCS App 110, and it facilitates A/V communications between near-end conference room 112*a* and far-end conference room 112*b*. Those of skill in the art can further appreciate that UCS App 110 can facilitate A/V communications with more than two conference rooms 112. Further, one or more of the communication sites do not necessarily need to be a conference room, but can be nothing more than a cellular "smart phone", tablet, laptop, desktop computer, and the like. Since a detailed discussion of the operation of UCS App 110 and A/V communications is not needed to understand the aspects of the embodiments, the same has been omitted in fulfillment of the dual purposes of clarity and brevity. UCS App 110 can be located in either or both of audio device 102 and server 104 (not shown, though understood, of course to be present, are processors, associated memory for storing the software/Apps, as well as other circuitry and interface devices). Further, additional software/applications can be included in either or both of audio device 102 and server 104 to process either or both of audio and video (if used/available), as well as other types of software for conference room scheduling and management.

Figure 2:
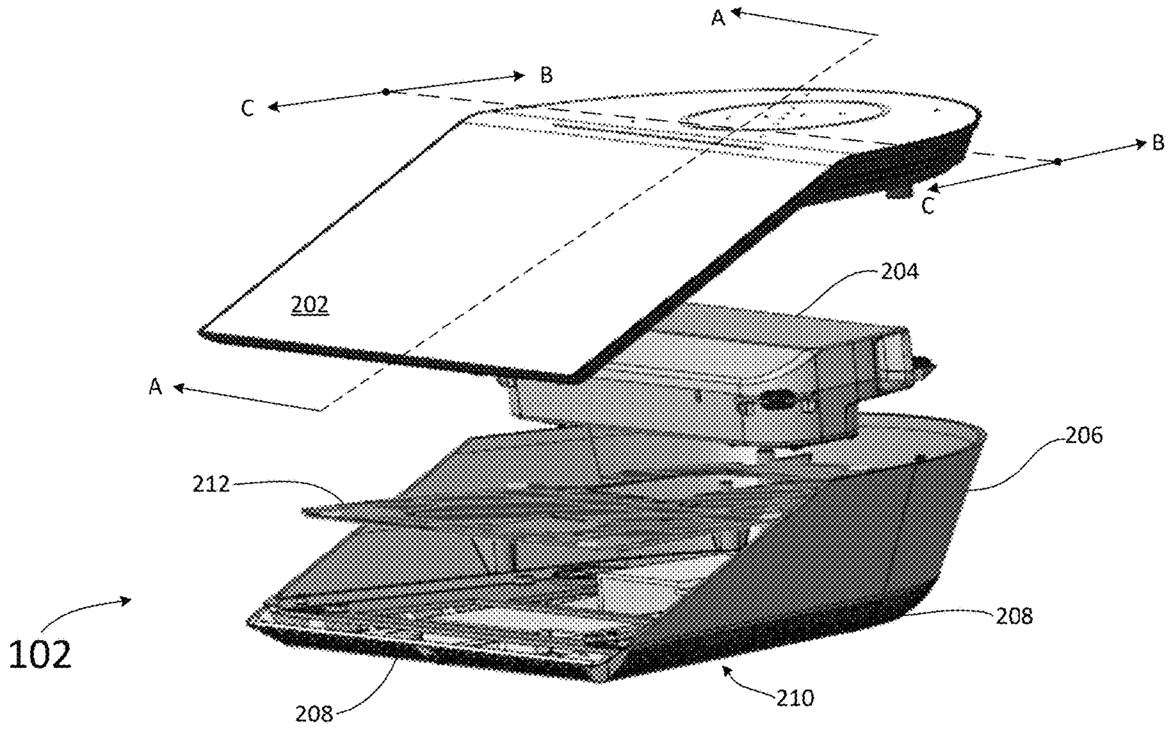
FIG. 2 illustrates a front isometric exploded view of a loudspeaker-microphone audio device (audio device) for use in a unified communications system wherein far-end audio is substantially uniformly distributed about the audio device according to aspects of the embodiments.

FIG. 2 illustrates a front isometric exploded view of audio device 102 for use in UCS 100 wherein far-end audio is substantially uniformly distributed about audio device 102 according to aspects of the embodiments. Audio device 102 comprises top cover 202, loudspeaker box 204 (which houses loudspeakers 402, shown in FIG. 4), body (or housing) 206, base grill 208, base 210, and PCB 212. Base 210 contains concave AWG 1004 (base 210 can also be referred to as base with concave AWG 210).

Aspects of the embodiments solve the problems discussed above by placing two or more loudspeakers (or transducers) 402 inside audio device 102 (and audio device 602, shown in FIG. 6, and described in greater detail below), substantially symmetrically located about a center axis of the audio device and in substantial alignment with each other, and pointing downward (e.g., the diaphragm is pointing to the base of audio device 102, that sits upon, typically, a conference room table). Each of the two or more loudspeakers 402 is located in loudspeaker box 204 that substantially encapsulates the majority of the loudspeaker 402 (all but an upper portion of a basket (metal, plastic, carbon-fiber, or other substantially rigid material, which holds the loudspeaker together), diaphragm, surround (lining that connects the basket with the diaphragm), and dust cap). The diaphragm, pointing downward, moves in response to electrical signals flowing through the voice coil (that sits in a magnet system), and the acoustic energy—sound waves—are broadcast from the diaphragm downward into an open area of audio device 102, within which are located a plurality of concave AWG 1004 or convex AWGs 406 (both of which are shown and discussed in greater detail below in regard to numerous Figures), and discussed in greater detail below). The plurality of concave AWGs 1004 (or convex AWGs 406) deflect the sound waves out from the base area of audio device 102 through a plurality of base grills 208 located at the base 210 of audio device 102, and sound waves 404 are thereby broadcast in a substantially circular pattern about audio device 102 such that a sound pressure level (SPL) measured about audio device 102 is substantially uniform in all directions according to aspects of the embodiments.

As those of skill in the art can appreciate, using multiple loudspeakers 402 to radiate sound may result in an undesirable effect called comb filtering. Comb filtering is characterized by severe variations of the sound in different directions. As those of skill in the art can further appreciate, comb filtering is a phenomenon that happens when the same sound arrives at the listener's ears (or a microphone) at different times with a very small delay between the signals. This delay can be anywhere from one sample to several milliseconds (up to 15 ms-20 ms). The slightly delayed signal can be created acoustically, as with a sound reflected from a hard surface (wall or glass pane), or electronically (either intentionally or not) through the use of delays or latency. The cancellations caused by the delayed arrival will create dips and peaks at certain frequencies. Depending on the time delay, some frequencies are reinforced while others will cancel out, causing a frequency response that looks similar to a comb—with lots of teeth, or peaks and dips/valleys. If comb filtering were to occur in audio device 102 due to placement and orientation of loudspeakers 402, then the solution would defeat the purpose. Thus, aspects of the embodiments substantially minimize comb filtering by causing the downward facing loudspeakers 402 to radiate sound in spatially controlled way. To achieve spatial control according to aspects of the embodiments, loudspeakers 402 face downward and radiate sound towards the deflecting surfaces of AWGs 406, 1004 that have been arranged to direct the sound outward from audio device 102 in such a manner as to substantially minimize comb filtering and provide a substantially uniform sound pressure level and radiation pattern about audio device 102.

Figure 3:
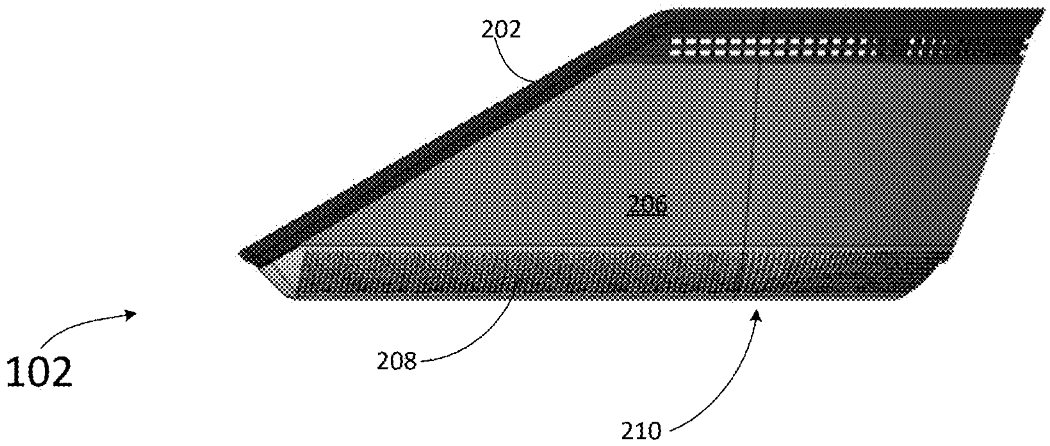
FIG. 3 illustrates a right side view of the audio device shown in FIG. 2 according to aspects of the embodiments.
Figure 4:
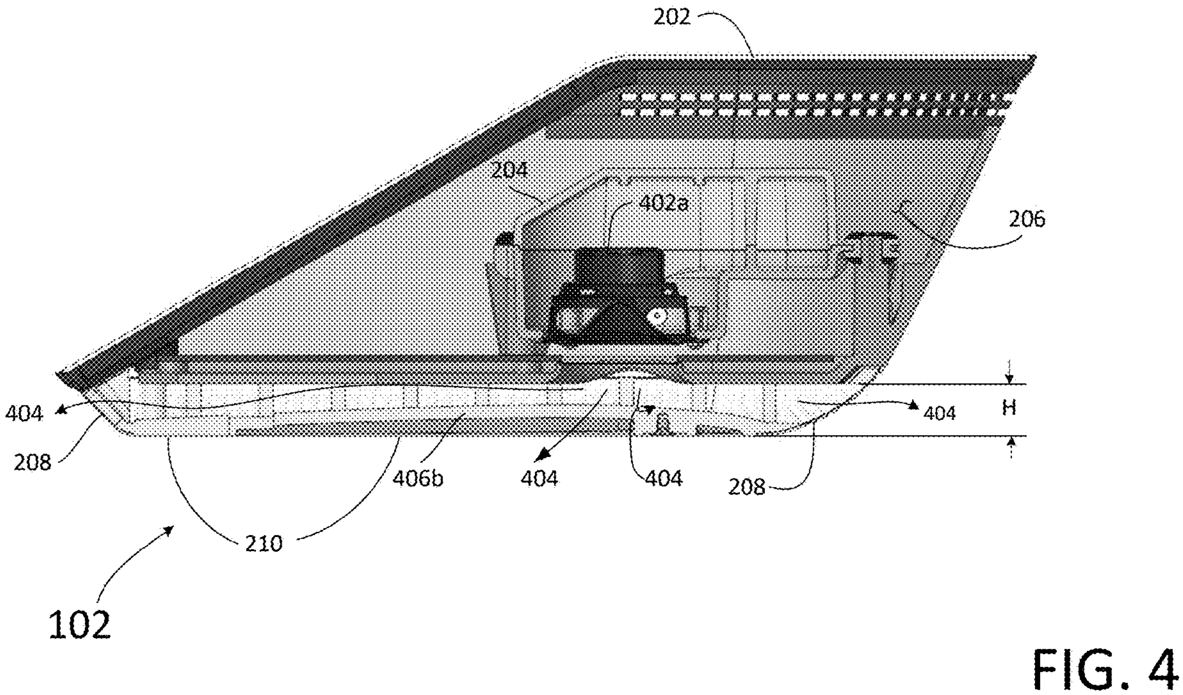
FIG. 4 illustrates right side sectional view of the audio device along lines A-A of FIG. 2 according to aspects of the embodiments.

FIG. 3 illustrates a right side view of the audio device shown in FIG. 2 according to aspects of the embodiments; and FIG. 4 illustrates right side sectional view of the audio device along lines A-A of FIG. 2 according to aspects of the embodiments.

Figure 8:
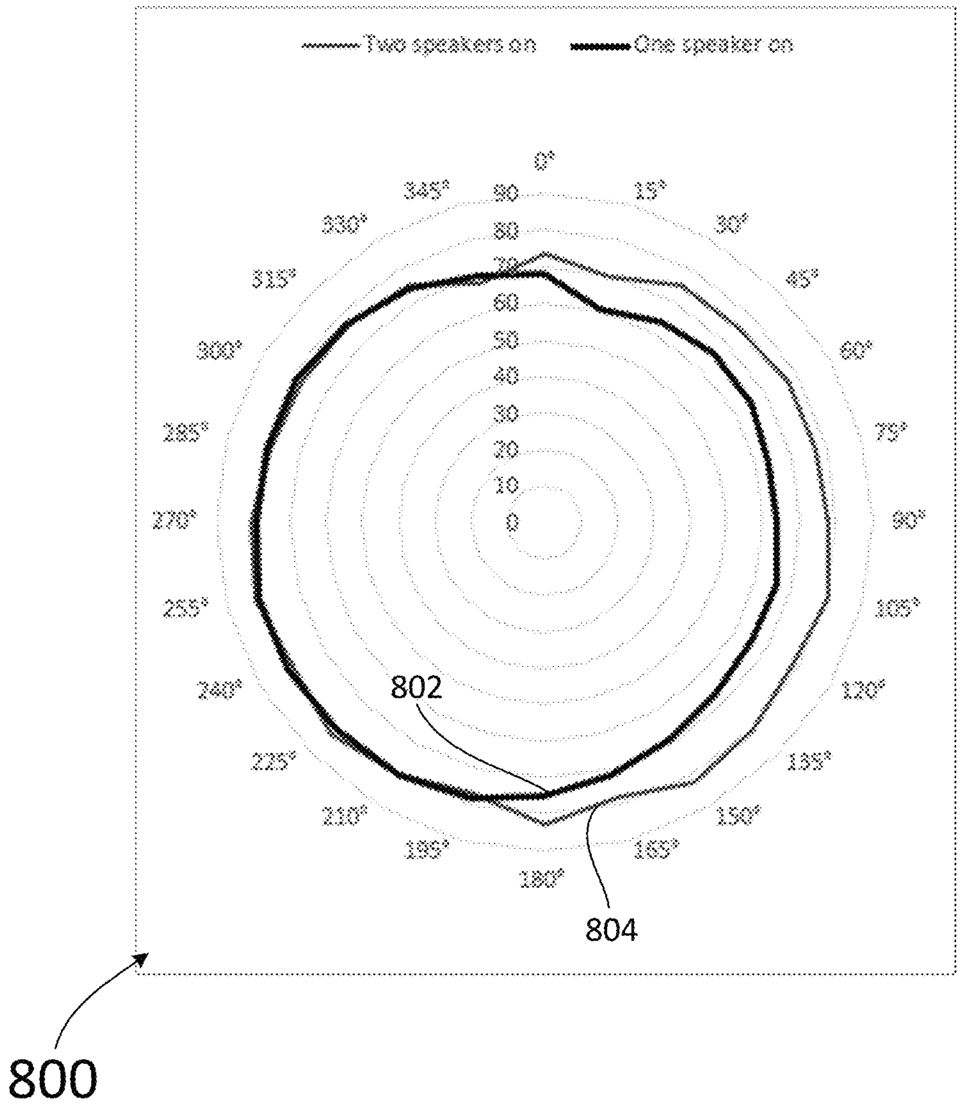
FIG. 8 illustrates a sound directivity diagram of the audio device according to FIGS. 1-7, with two patterns superimposed—a first pattern with only a first loudspeaker operating, and a second pattern with both the first and a second loudspeaker operating.

In FIG. 4, sound waves 404 are broadcast by loudspeaker 402*a*. Loudspeaker 402*a* is located within loudspeaker box 204, substantially enclosing loudspeaker 402*a*, except for the diaphragm, as described above. Sound waves 404 that are broadcast by loudspeaker 402*a* through the opening in the bottom portion of housing 206 hit or encounter concave lower boundary of convex AWG 406, and are deflected in substantially all directions—i.e., about 360° about a center axis of loudspeaker 402*a*; a substantially similar pattern of sound waves are broadcast from loudspeaker 402*b* (not seen in FIG. 4), but substantially oppositely located such that a substantially circular pattern of sound leaves audio device 102, resulting in the broadcast audio SPL patterns of FIG. 8 according to aspects of the embodiments. The bottom portion of housing 206 comprises the upper boundary of convex AWG 406. Sound waves 404 are channeled between convex AWG 406 and the bottom portion of housing 206. Referring briefly to FIG. 8, there is shown sound radiation diagram 800, with first sound radiation pattern with a first loudspeaker 402 operating (first sound radiation pattern) 802 and second sound radiation pattern with the first and a second loudspeaker 402 operating (second sound radiation pattern) 804. Notice should be made that although there is only a first loudspeaker 402 in first sound radiation pattern 802, the radiation pattern extends over 360° and there is about a 15 dB attenuation on the right hand side between first sound radiation pattern 802 and second sound radiation pattern 804, wherein second sound radiation pattern 804 is with two loudspeakers 402*a, b* broadcasting. While the radiation patterns of FIG. 8 were generated with convex AWG 406, according to aspects of the embodiments, a radiation pattern with use of concave AWG 1004 is substantially similar.

Figure 5:
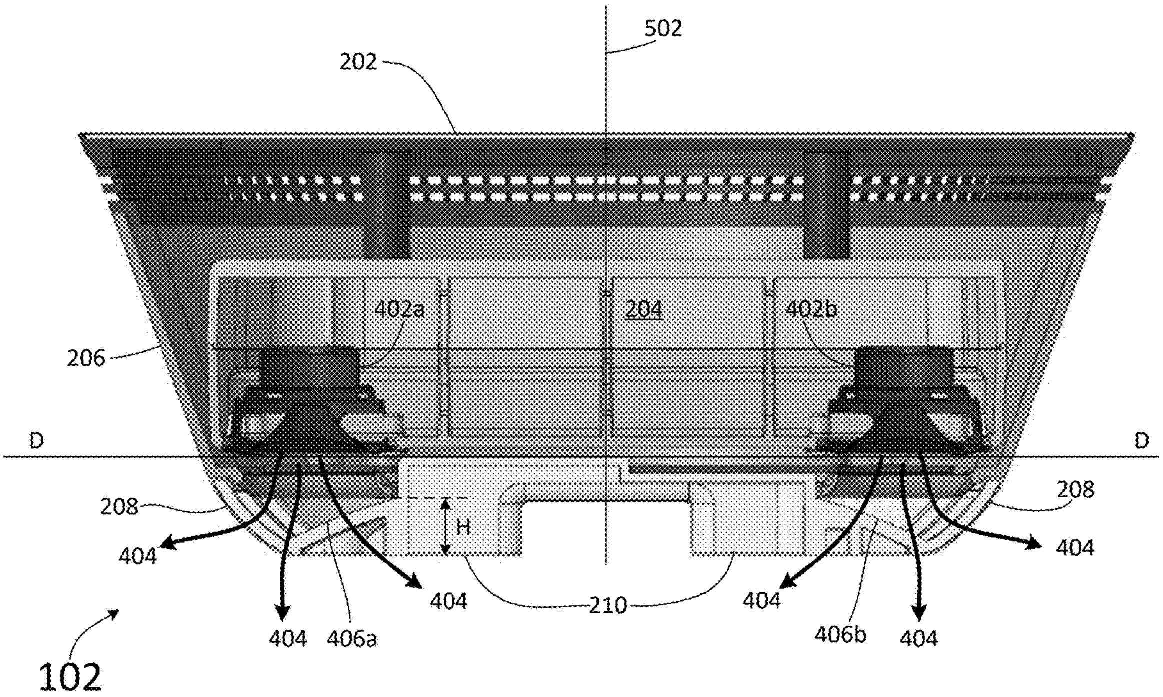
FIG. 5 illustrates a front side sectional view of the audio device along lines B-B of FIG. 2 according to aspects of the embodiments.

FIG. 5 illustrates a front side sectional view of audio device 102 along lines B-B of FIG. 2 according to aspects of the embodiments.

The view of FIG. 5 shows a cross sectional view of loudspeaker box 204, illustrating the approximate location of loudspeakers 402*a, b*. First and second loudspeakers 402*a, b* are located substantially equidistant about center axis 502. Sound waves 404 leave loudspeakers 402*a, b*, respectively, through the openings in the bottom portion of housing 206 and encounter convex AWGs 406*a, b*, respectively, which are shown in greater detail in FIGS. 19-27, and 32-35, and concave AWGs 1004 are shown in greater detail in FIGS. 10-18, 28-31). Due to the design of both convex and concave AWGs 406*a, b*, 1004*a, b*, respectively, sound waves 404 are deflected from both loudspeakers 402*a, b* in substantially all directions according to aspects of the embodiments, leading to a substantially uniform dispersion of sound around audio device 102 according to aspects of the embodiments.

Figure 6:
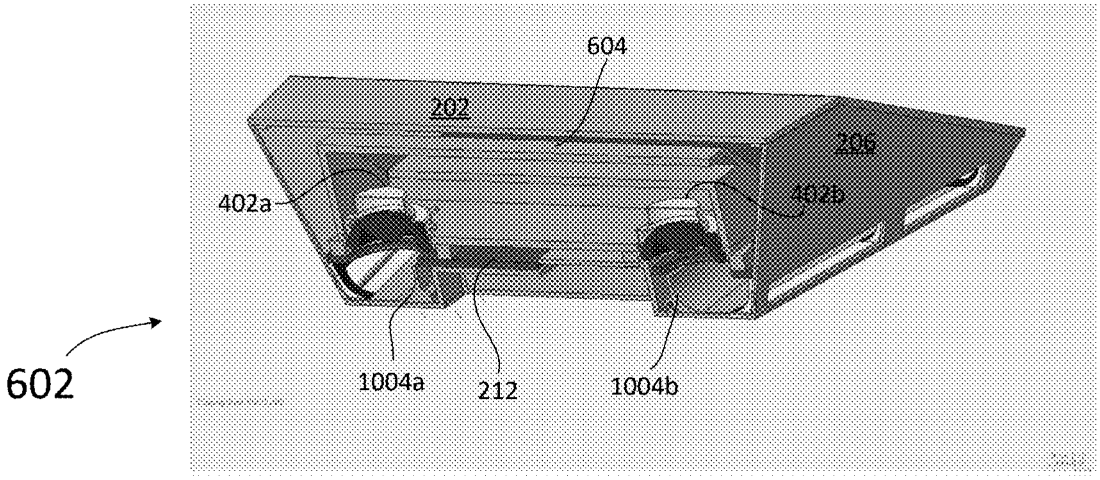
FIG. 6 illustrates a rear side sectional view of the audio device along lines C-C of FIG. 2 according to aspects of the embodiments.
Figure 7:
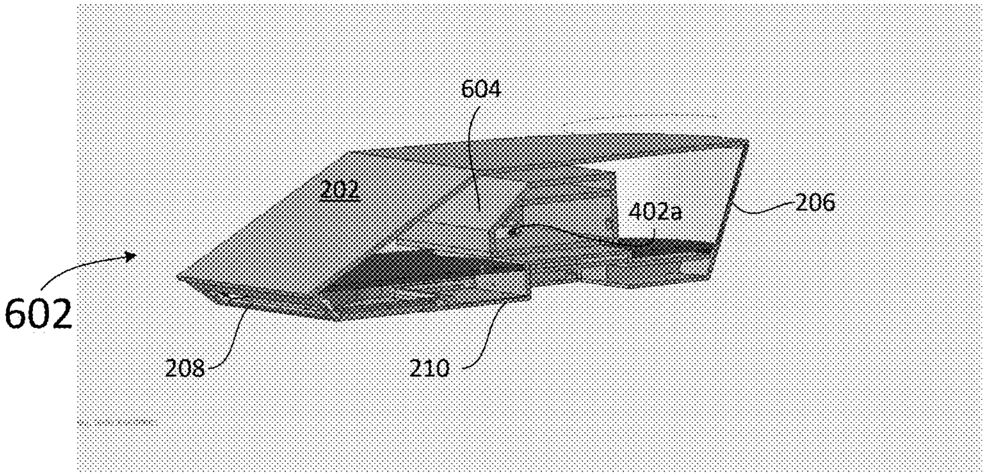
FIG. 7 illustrates an alternate right side sectional view of the audio device along lines A-A of FIG. 2 according to aspects of the embodiments.

FIG. 6 illustrates a rear side sectional view of audio device 602 along lines C-C of FIG. 2 according to aspects of the embodiments, and FIG. 7 illustrates an alternate right side sectional view of audio device 602 along lines A-A of FIG. 2 according to aspects of the embodiments. The embodiment of audio device 602 of FIGS. 6 and 7 is substantially similar to that of audio device 102 of FIGS. 2-5, and audio device 114, which contains convex AWG 406, discussed in greater detail below, with the exception of loudspeaker box 604, which while substantially functionally similar to loudspeaker box 204, is nonetheless constructed in a somewhat different manner. Also, audio device 602 includes concave AWG 1004*a, b* according to aspects of the embodiments.

FIG. 8 illustrates a sound directivity diagram of audio devices 102, and 602, according to FIGS. 1-7, with two patterns superimposed—a first sound radiation pattern 802 with only a first loudspeaker 402 operating, and a second sound radiation pattern 804 with both the first and a second loudspeaker 402*a, b* operating (according to aspects of the embodiments, the sound directivity diagram of FIG. 8 also applies to audio device 114). Both first and second sound radiation patterns 802, 804 are generated due to the interaction between convex AWG 406, the lower portion of 206, and sound waves that are generated by first and second loudspeakers 402*a, b*. Although audio devices 102, 114, and 602 function substantially similarly, in fulfillment of the dual purposes of clarity and brevity, reference will only be made to audio devices 102 and 114, as these contain concave AWG 1004 and convex AWG 406, respectively.

Figure 9:
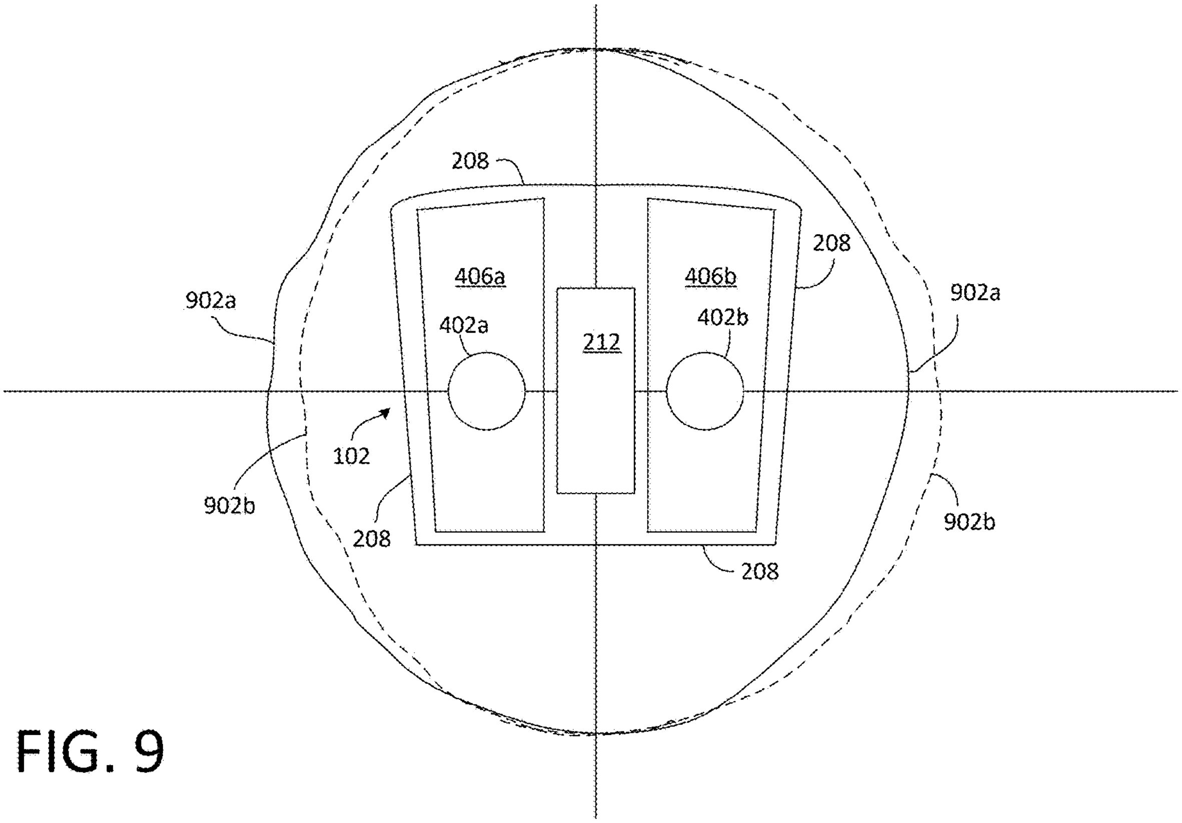
FIG. 9 illustrates a sound directivity diagram that is substantially similar to that of FIG. 8, but also including a view along the plane of line D-D of FIG. 5 according to aspects of the embodiments.

FIG. 9 illustrates a sound directivity diagram that is substantially similar to that of FIG. 8, but also includes a view of audio device 102, 114 along the plane of line D-D of FIG. 5 according to aspects of the embodiments. First sound radiation pattern 902*a* is generated by loudspeaker 402*a*, and second sound radiation pattern 902*b* is generated by loudspeaker 402*b*; note that both first and second sound radiation patterns 902*a, b* are not substantially circular; each has a characteristic flattening on the side opposite to the respective loudspeaker 402 which generates it. It is in combination that the two sound radiation patterns form a substantially circular and uniform sound radiation pattern such as that shown in FIG. 8 and combined second sound radiation pattern 804 according to aspects of the embodiments.

Figure 10:
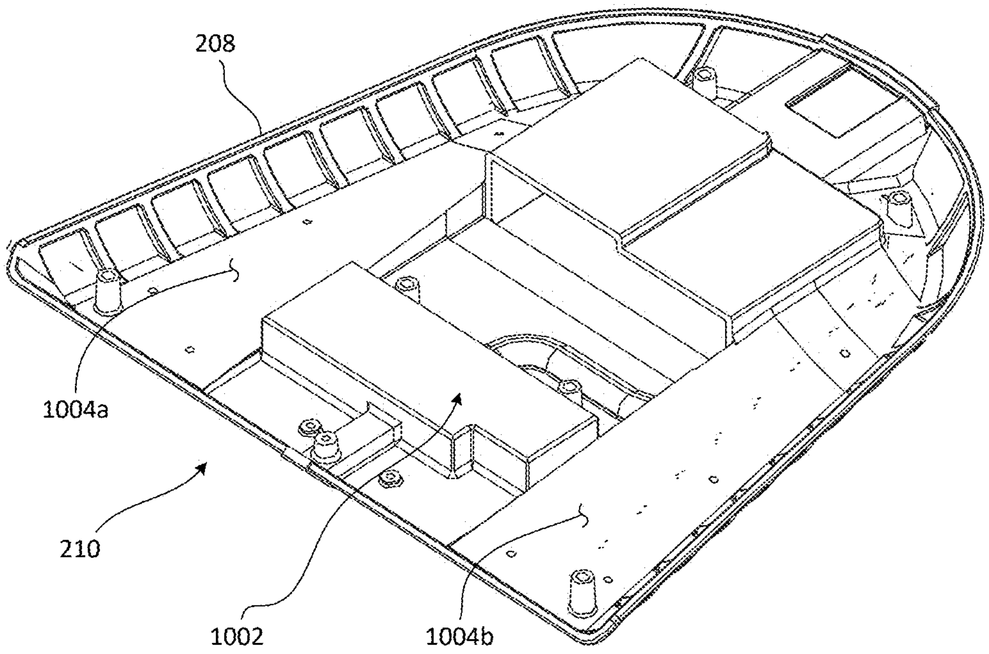
FIG. 10 illustrates a top isometric view of the base piece of the audio device shown in regard to FIGS. 1-9 with a concave acoustic waveguide according to aspects of the embodiments.
Figure 11:
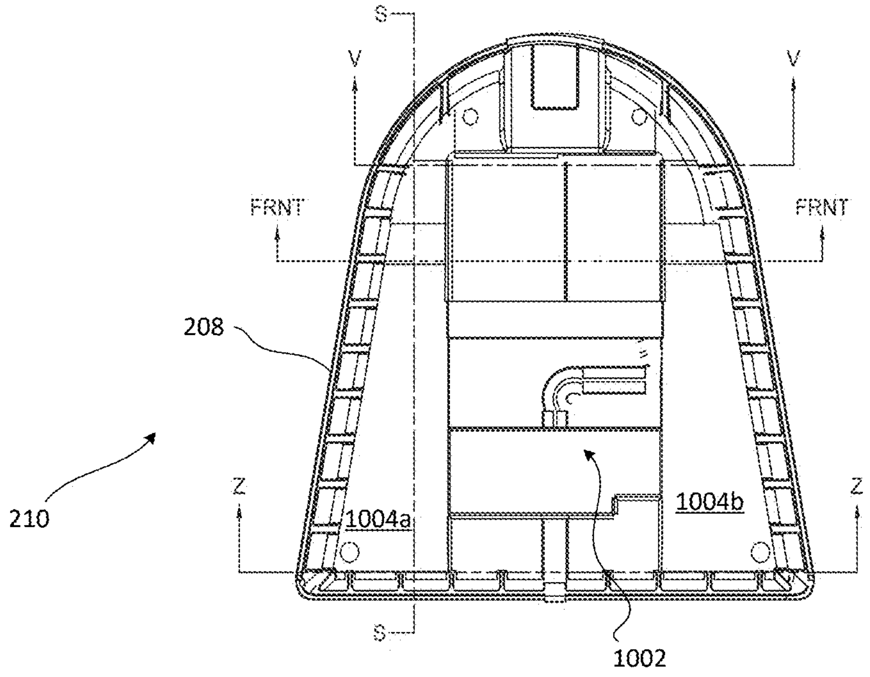
FIG. 11 illustrates a top view of the base piece shown in FIG. 10 of the audio device shown in regard to FIGS. 1-9 with a concave acoustic waveguide according to aspects of the embodiments.
Figure 12:
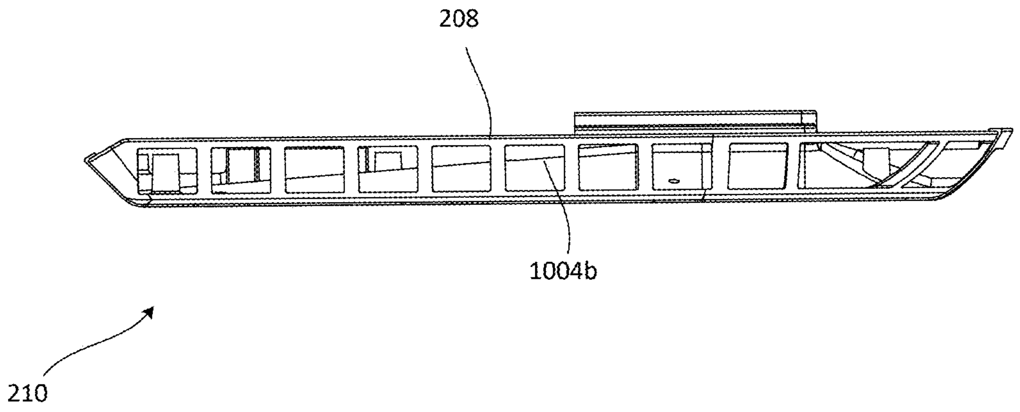
FIG. 12 illustrates a right side view of the base piece shown in FIG. 10 of the audio device shown in regard to FIGS. 1-9 with a concave acoustic waveguide according to aspects of the embodiments.
Figure 13:
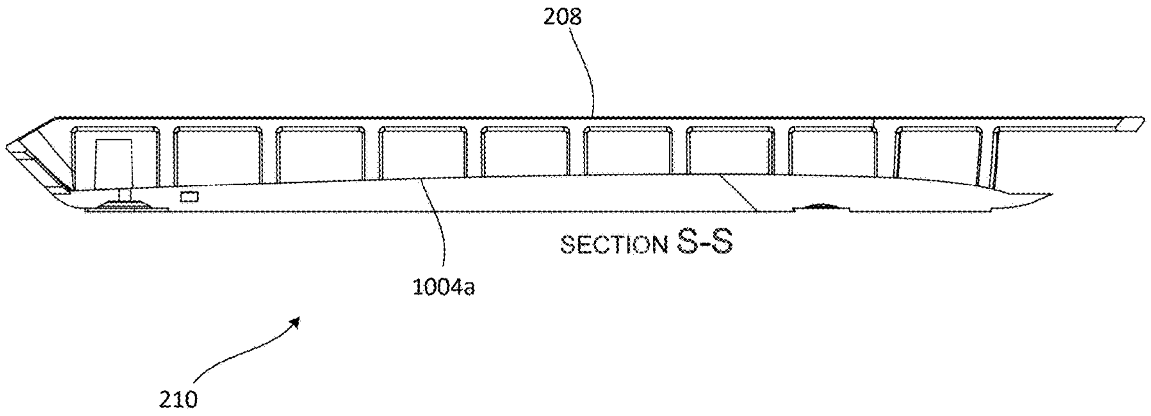
FIG. 13 illustrates a left side view along line S-S of the base piece shown in FIG. 10 of the audio device shown in regard to FIGS. 1-9 with a concave acoustic waveguide according to aspects of the embodiments.
Figure 14:
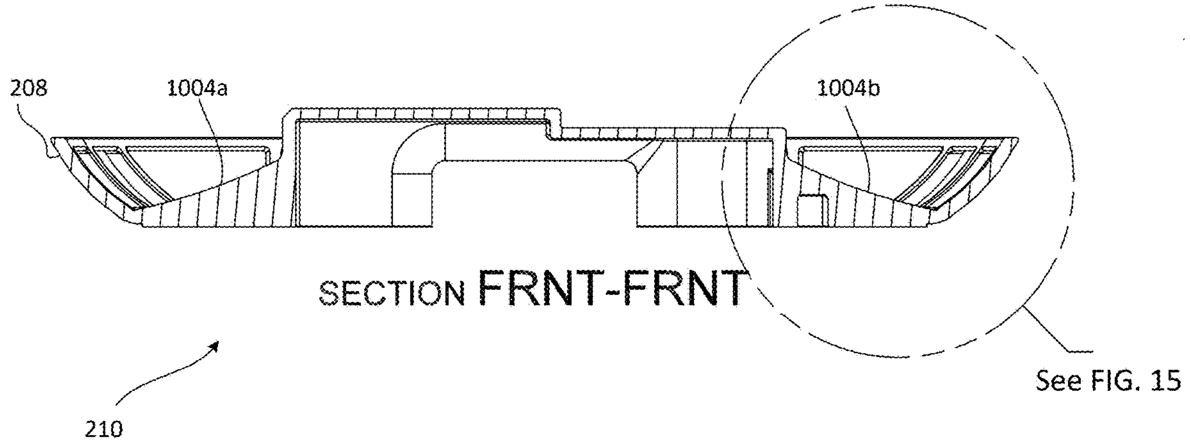
FIG. 14 illustrates a rear view along line FRNT-FRNT of the base piece shown in FIG. 10 of the audio device shown in regard to FIGS. 1-9 with a concave acoustic waveguide according to aspects of the embodiments.
Figure 15:
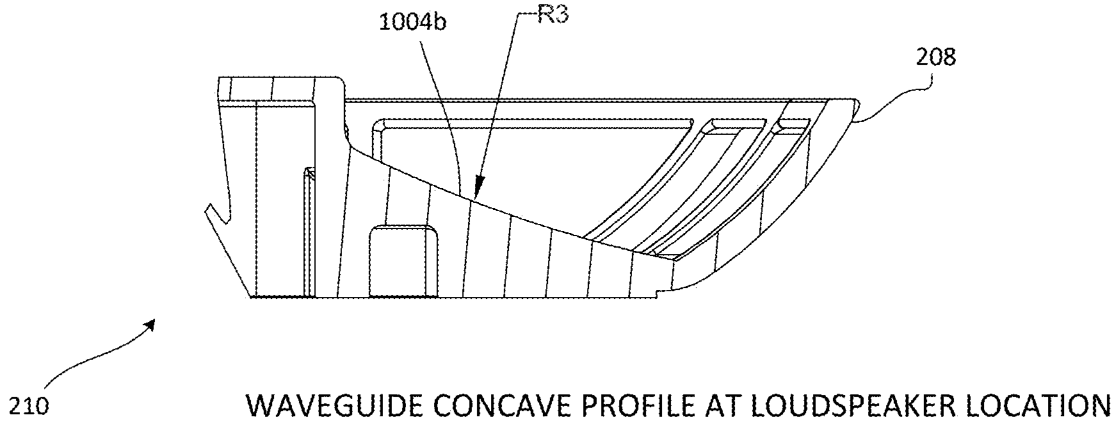
FIG. 15 illustrates a detailed view of FIG. 14 of the base piece shown in FIG. 10 of the audio device shown in FIGS. 1-9 showing a radius of curvature of a concave acoustic waveguide profile at a loudspeaker location of the concave acoustic waveguide according to aspects of the embodiments.
Figure 16:
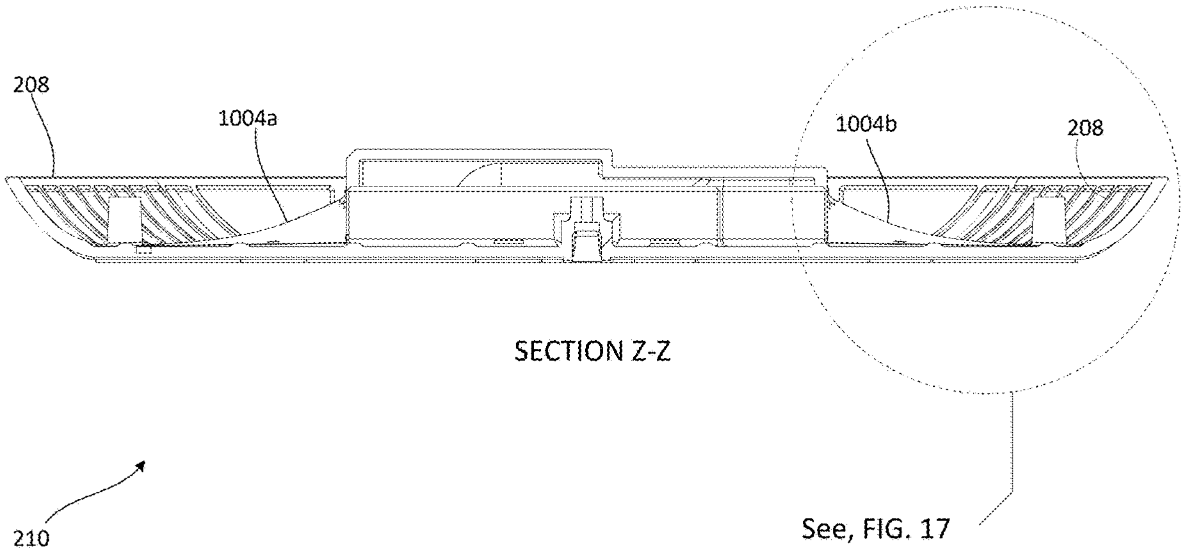
FIG. 16 illustrates a rear view along line Z-Z of the base piece shown in FIG. 10 of the audio device shown in regard to FIGS. 1-9 with a concave acoustic waveguide according to aspects of the embodiments.
Figure 17:
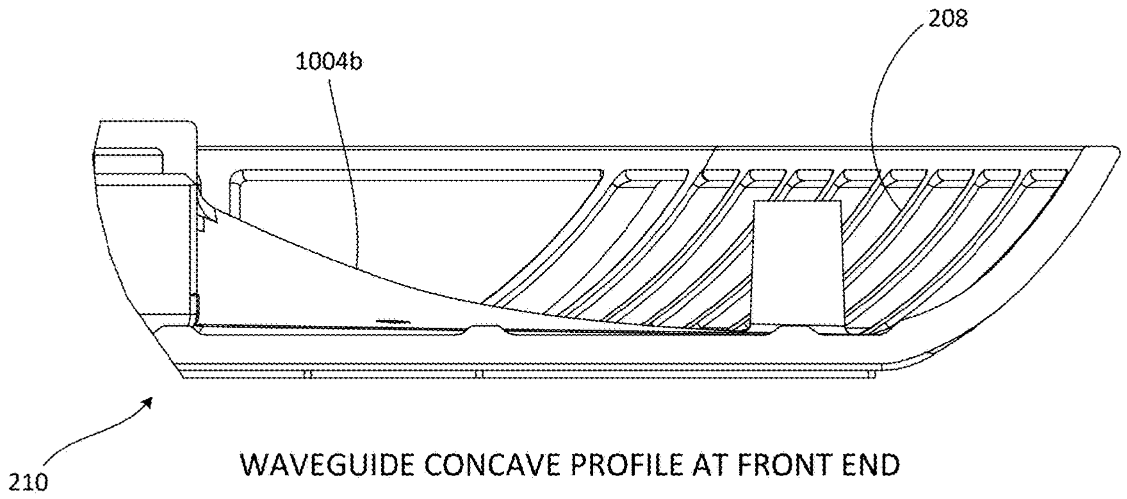
FIG. 17 illustrates a detailed view of FIG. 16 of the base piece shown in FIG. 10 of the audio device shown in FIGS. 1-9 showing a radius of curvature of a concave acoustic waveguide profile at a front end of the concave acoustic waveguide according to aspects of the embodiments.
Figure 18:
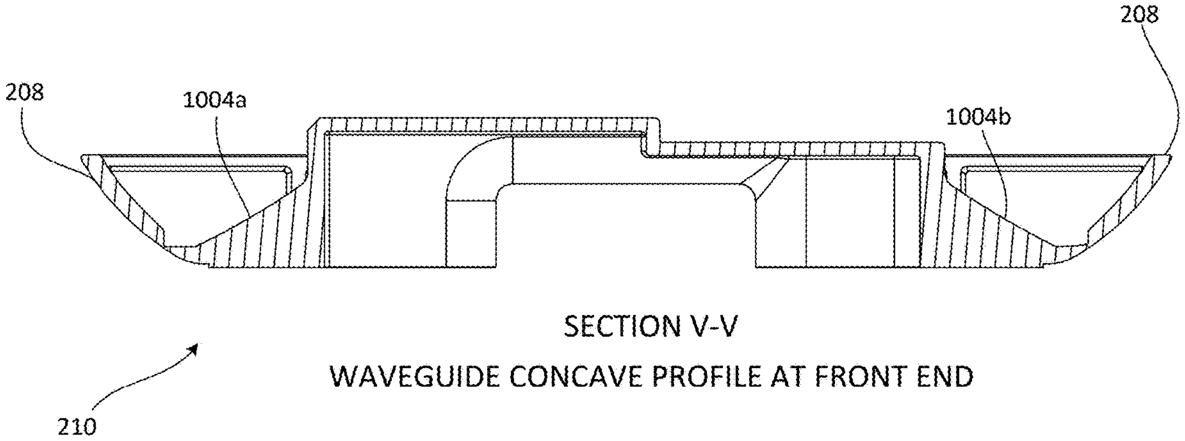
FIG. 18 illustrates a rear view along line V-V of the base piece shown in FIG. 10 of the audio device shown in FIGS. 1-9 showing a concave acoustic waveguide profile at a rear end of the concave acoustic waveguide according to aspects of the embodiments.

FIGS. 10-18 pertain to audio device 102 that uses concave AWG 1004 according to aspects of the embodiments. In particular, FIG. 10 illustrates a top isometric view of base 210 of audio device 102 shown in regard to FIGS. 1-9 with concave AWG 1004 mounted on internal mounting structure 1002 according to aspects of the embodiments; FIG. 11 illustrates a top view of base 210 shown in FIG. 10 of audio device 102 shown in regard to FIGS. 1-9 with concave AWG 1004 according to aspects of the embodiments; FIG. 12 illustrates a right side view of base 210 shown in FIG. 10 of audio device 102 shown in regard to FIGS. 1-9 with concave AWG 1004 according to aspects of the embodiments; FIG. 13 illustrates a left side view along line S-S of base 210 shown in FIG. 10 of audio device 102 shown in regard to FIGS. 1-9 with concave AWG 1004 according to aspects of the embodiments; FIG. 14 illustrates a rear view along line FRNT-FRNT of base 210 shown in FIG. 10 of audio device 102 shown in regard to FIGS. 1-9 with concave AWG 1004 according to aspects of the embodiments; FIG. 15 illustrates a detailed view of FIG. 14 of base 210 shown in FIG. 10 of audio device 102 shown in FIGS. 1-9 showing a radius of curvature of a concave AWG profile at a loudspeaker location of concave AWG 1004 according to aspects of the embodiments; FIG. 16 illustrates a rear view along line Z-Z of base 210 shown in FIG. 10 of audio device 102 shown in regard to FIGS. 1-9 with concave AWG 1004 according to aspects of the embodiments; FIG. 17 illustrates a detailed view of FIG. 16 of base 210 shown in FIG. 10 of audio device 102 shown in FIGS. 1-9 showing a radius of curvature of a concave AWG profile at a front end of concave AWG 1004 according to aspects of the embodiments; and FIG. 18 illustrates a rear view along line V-V of base 210 shown in FIG. 10 of audio device 102 shown in FIGS. 1-9 showing a concave AWG profile at a rear end of concave AWG 1004 according to aspects of the embodiments.

Figure 19:
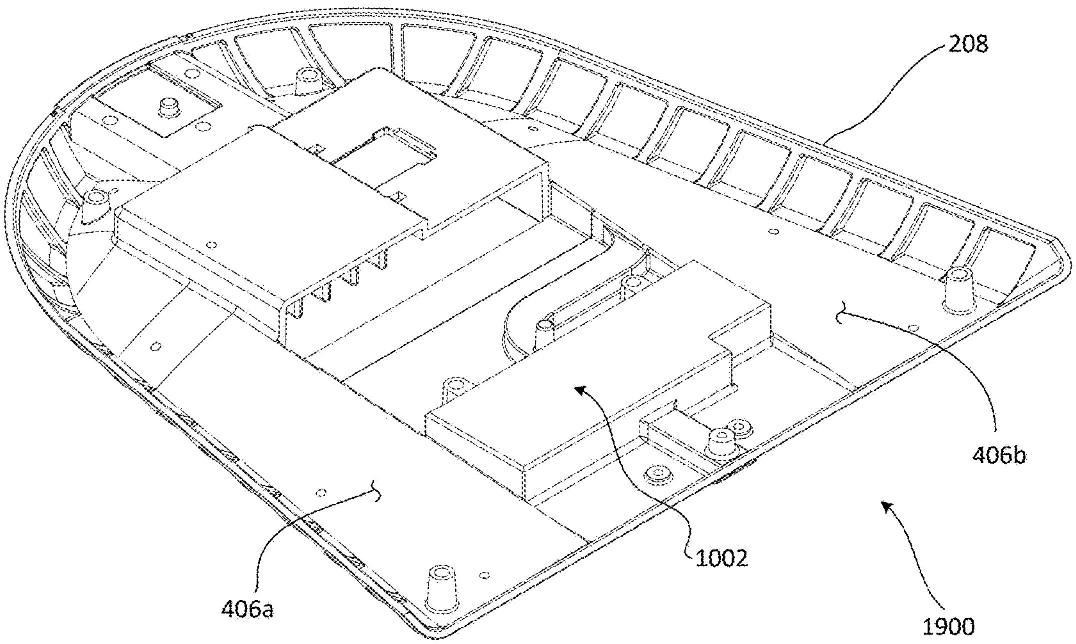
FIG. 19 illustrates a top isometric view of a base piece of the audio device shown in regard to FIGS. 1-9 but with a convex acoustic waveguide according to aspects of the embodiments.
Figure 20:
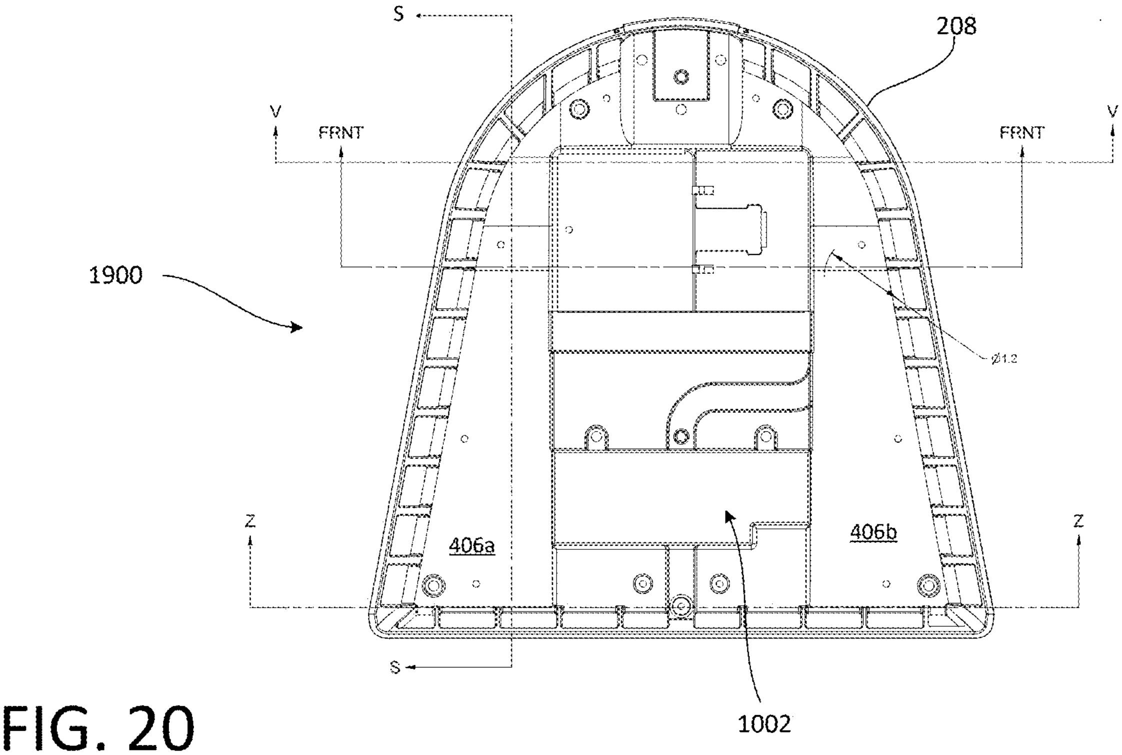
FIG. 20 illustrates a top view of the base piece shown in FIG. 19 with a convex acoustic waveguide according to aspects of the embodiments.
Figure 21:
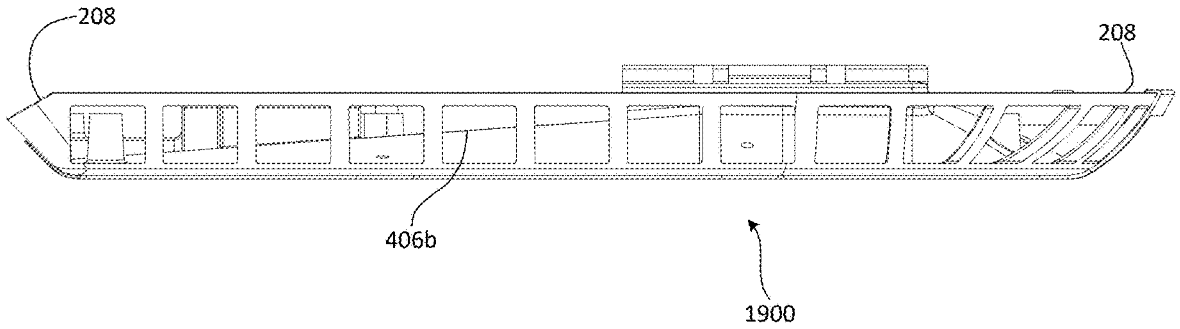
FIG. 21 illustrates a right side view of the base piece shown in FIG. 19 with a convex acoustic waveguide according to aspects of the embodiments.
Figure 22:
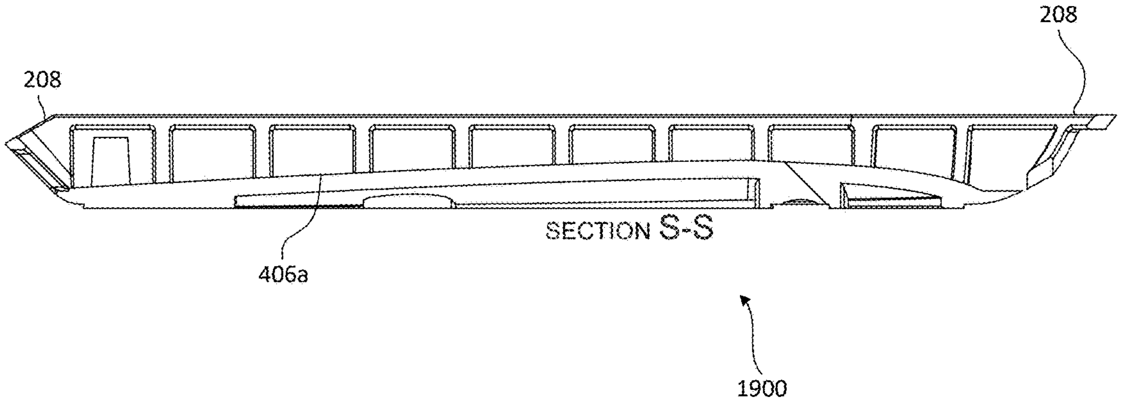
FIG. 22 illustrates a left side view along line S-S of the base piece shown in FIG. 19 with a convex acoustic waveguide according to aspects of the embodiments.
Figure 23:
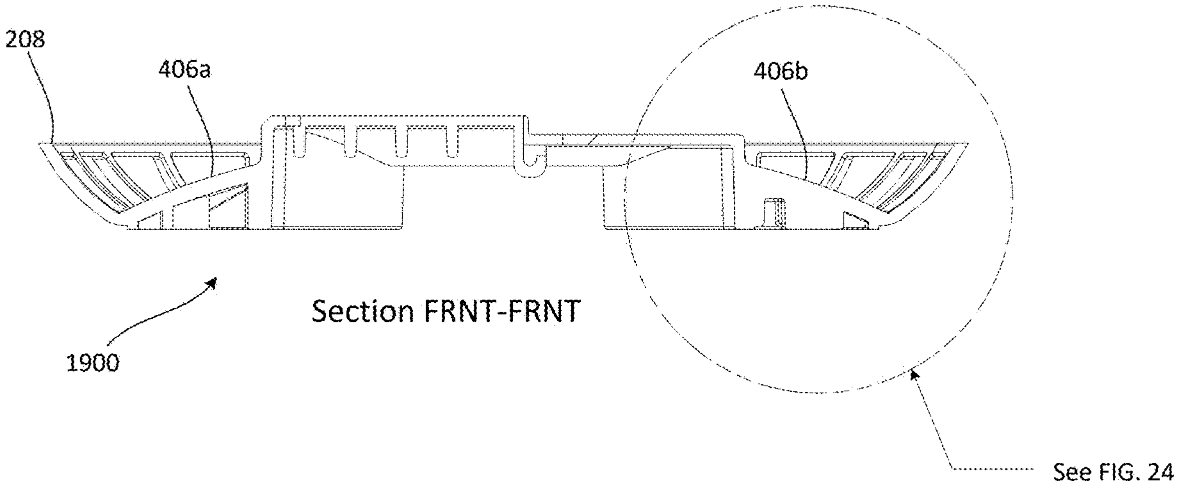
FIG. 23 illustrates a rear view along line FRNT-FRNT of the base piece shown in FIG. 19 with a convex acoustic waveguide according to aspects of the embodiments.
Figure 24:
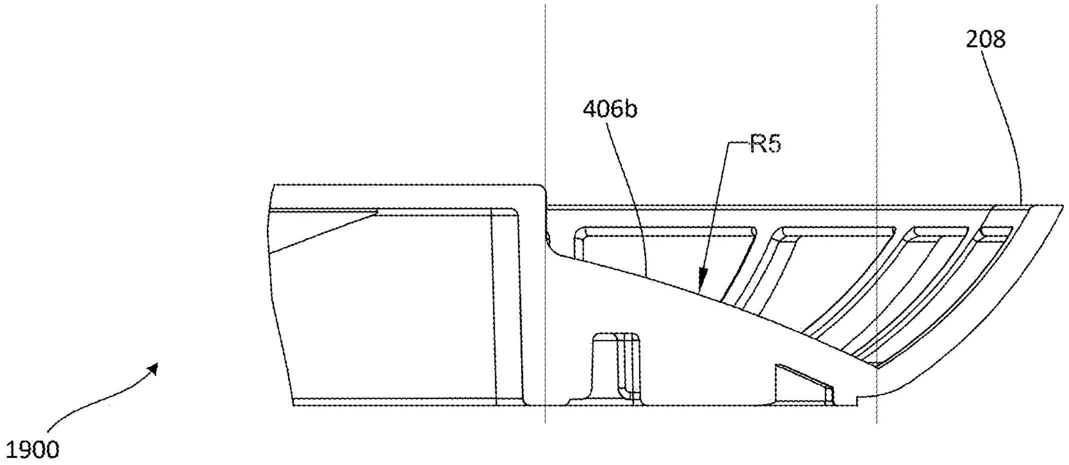
FIG. 24 illustrates a detailed view of FIG. 23 of the base piece shown in FIG. 19 showing a radius of curvature of a convex acoustic waveguide profile at a loudspeaker location of the convex acoustic waveguide according to aspects of the embodiments.
Figure 25:
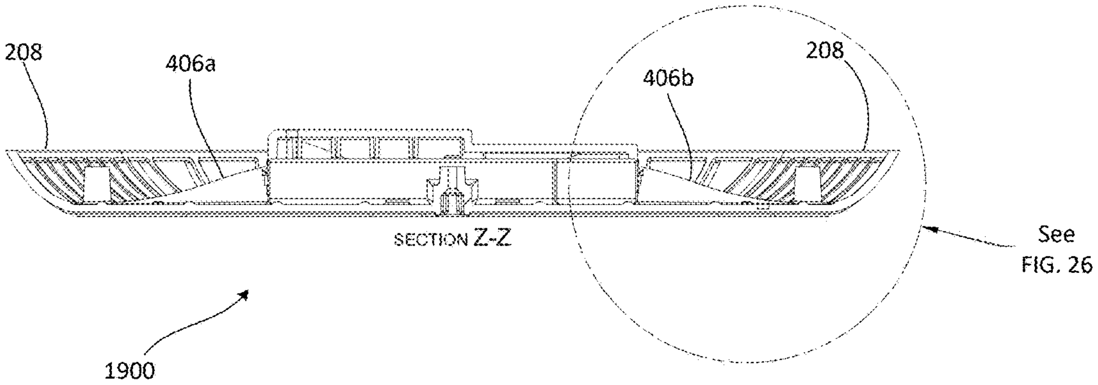
FIG. 25 illustrates a rear view along line Z-Z of the base piece shown in FIG. 19 with a convex acoustic waveguide according to aspects of the embodiments.
Figure 26:
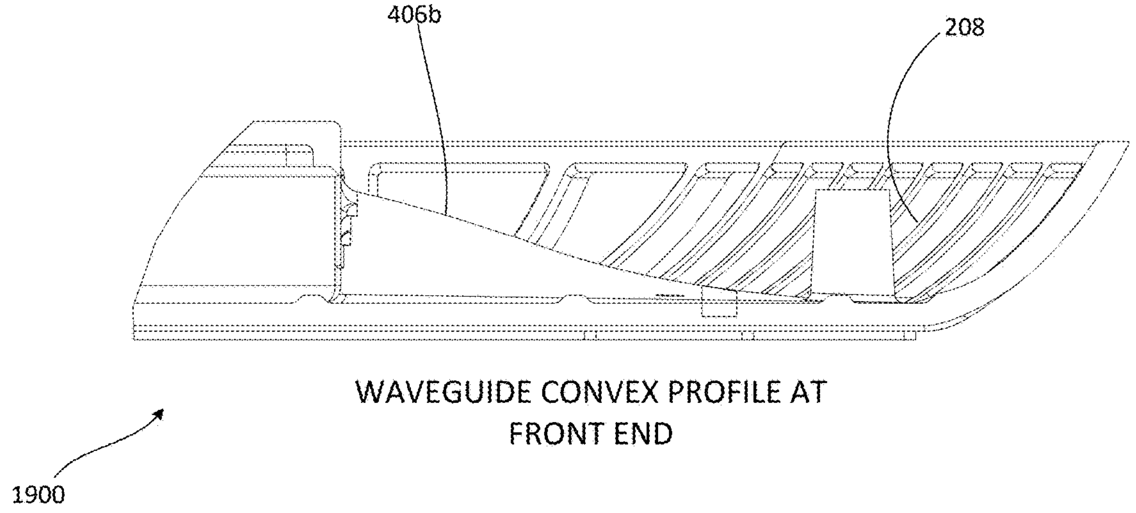
FIG. 26 illustrates a detailed view of FIG. 25 of the base piece shown in FIG. 19 showing a radius of curvature of a convex acoustic waveguide profile at a front end of the convex acoustic waveguide according to aspects of the embodiments.
Figure 27:
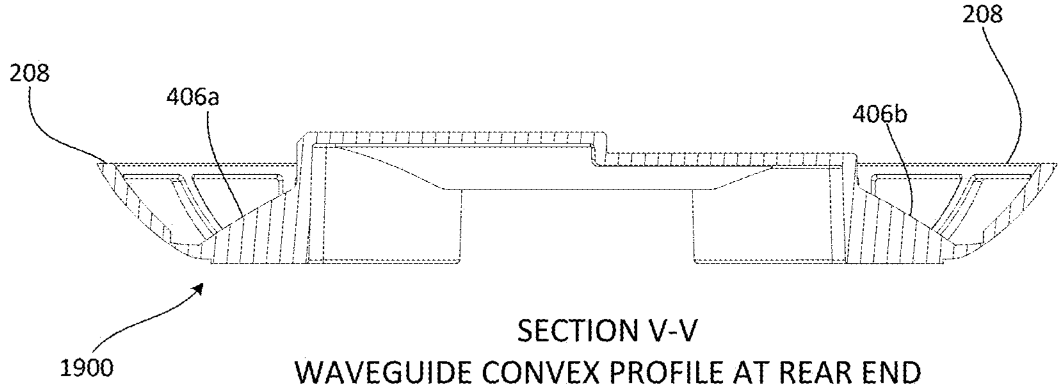
FIG. 27 illustrates a rear view along line V-V of the base piece shown in FIG. 19 showing a convex acoustic waveguide profile at a rear end of the convex acoustic waveguide according to aspects of the embodiments.

FIGS. 19-27 illustrates different views of base 1900, which comprises convex AWG 406 according to aspects of the embodiments. Base 1900 is part of audio device 114. In particular, FIG. 19 illustrates a top isometric view of base 1900 of audio device 114 with convex AWG 406 according to aspects of the embodiments; FIG. 20 illustrates a top view of base 1900 shown in FIG. 19 of audio device 114 with convex AWG 406 according to aspects of the embodiments; FIG. 21 illustrates a right side view of base 1900 shown in FIG. 19 of audio device 114, with convex AWG 406 according to aspects of the embodiments; FIG. 22 illustrates a left side view along line S-S of base 1900 shown in FIG. 19 of audio device 114 with convex AWG 406 according to aspects of the embodiments; FIG. 23 illustrates a rear view along line FRNT-FRNT of base 1900 shown in FIG. 19 of audio device 114 with convex AWG 406 according to aspects of the embodiments; FIG. 24 illustrates a detailed view of FIG. 23 of base 1900 shown in FIG. 19 of audio device 114 showing a radius of curvature of convex AWG profile at loudspeaker 402 location of convex AWG 406 according to aspects of the embodiments; FIG. 25 illustrates a rear view along line Z-Z of base 1900 shown in FIG. 19 of audio device 114 with convex AWG 406 according to aspects of the embodiments; FIG. 26 illustrates a detailed view of FIG. 25 of base 1900 shown in FIG. 19 of audio device 114 showing a radius of curvature of a convex AWG profile at a front end of convex AWG 406 according to aspects of the embodiments; and FIG. 27 illustrates a rear view along line V-V of base 1900 shown in FIG. 19 of audio device 114 showing a convex AWG profile at a rear end of convex AWG 406 according to aspects of the embodiments.

Figure 28:
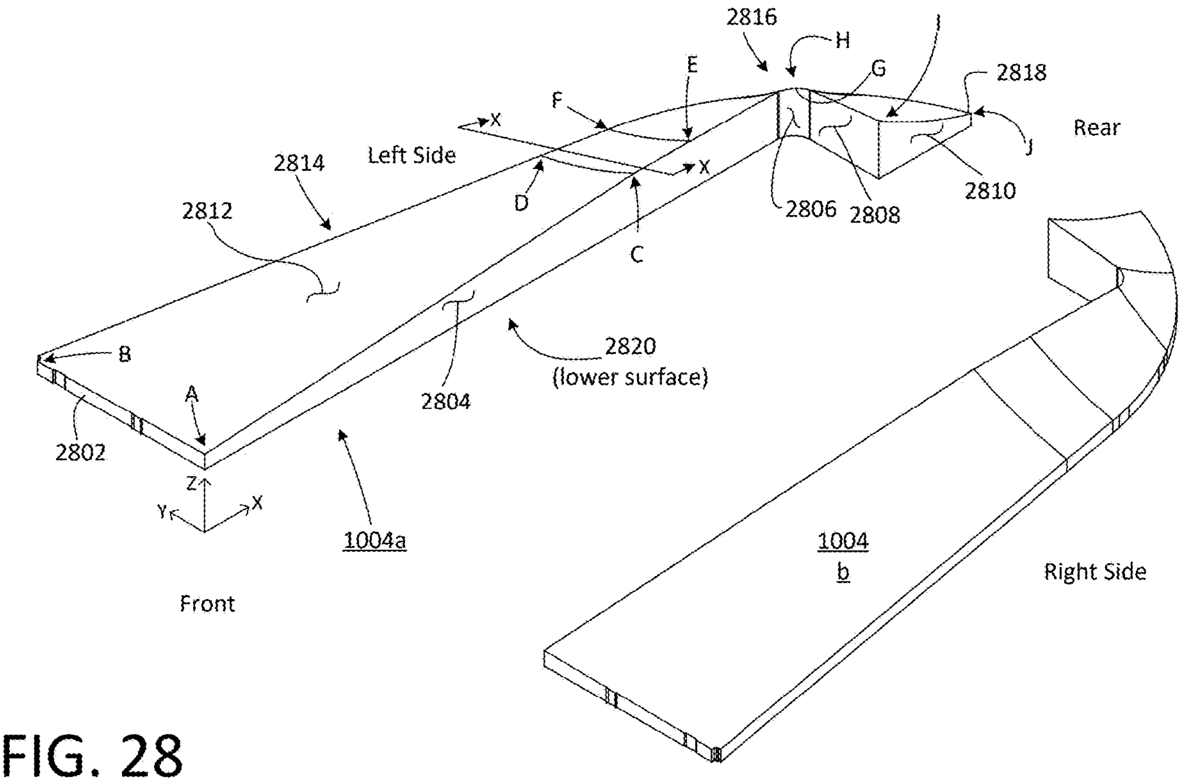
FIG. 28 illustrates a top isometric view of the concave acoustic waveguide isolated from other components of the base piece as shown in FIGS. 10-18 according to aspects of the embodiments.
Figure 29:
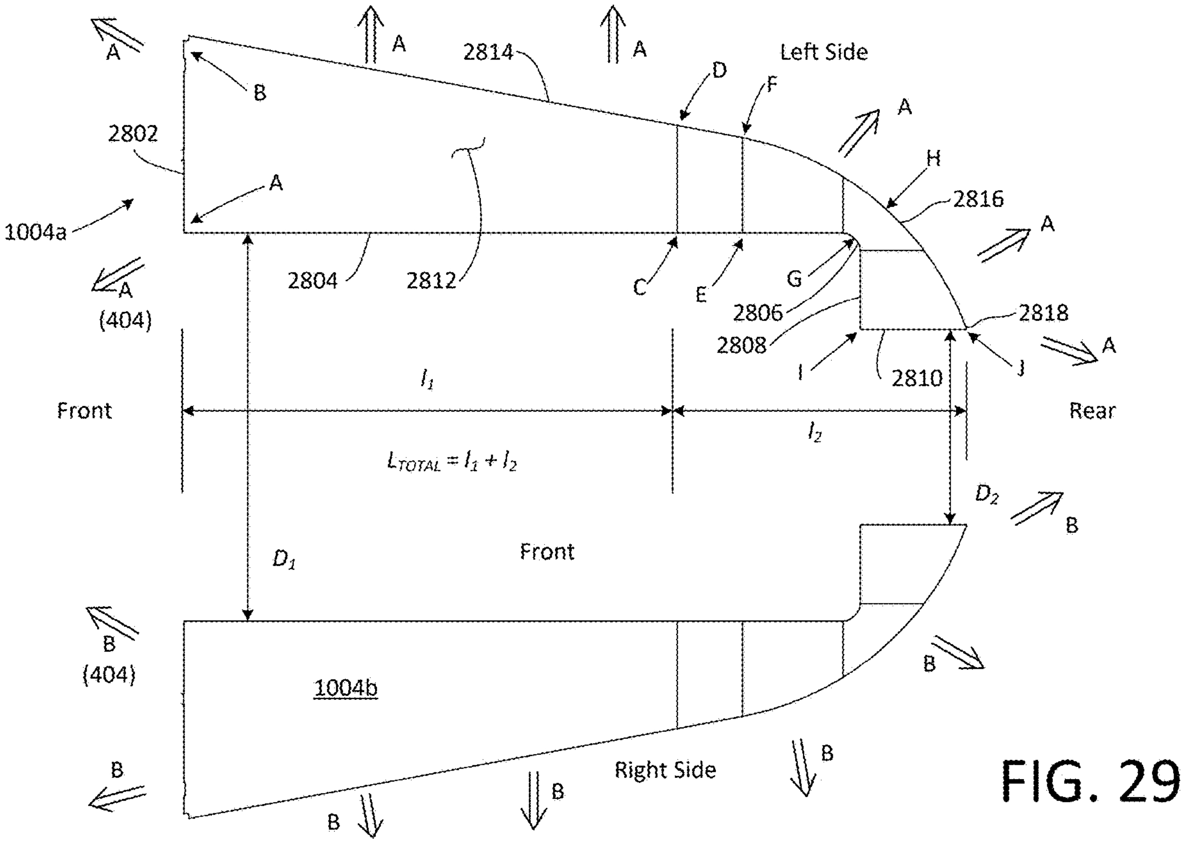
FIG. 29 illustrates a top view of the concave acoustic waveguide isolated from other components of the base piece as shown in FIGS. 10-18 according to aspects of the embodiments.
Figure 30:
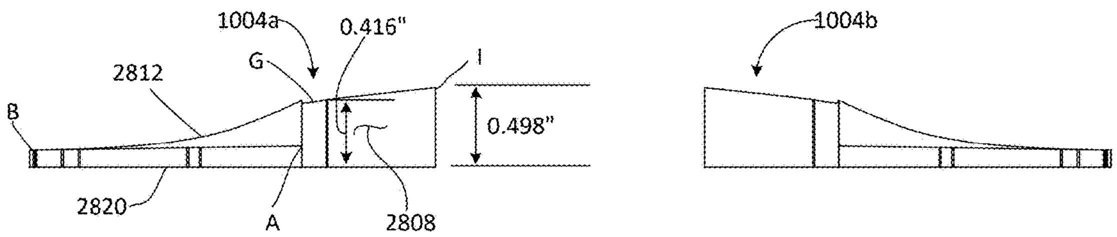
FIG. 30 illustrates a front view of the concave acoustic waveguide isolated from other components of the base piece as shown in FIGS. 10-18 according to aspects of the embodiments.
Figure 31:
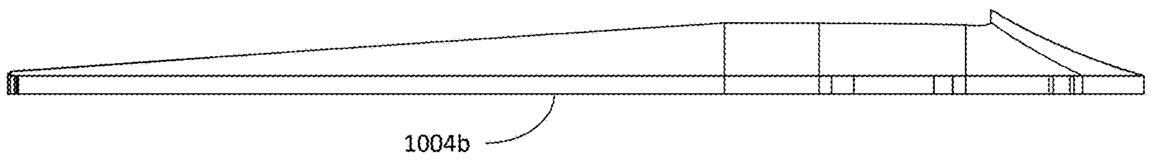
FIG. 31 illustrates a right side view of the concave acoustic waveguide isolated from other components of the base piece as shown in FIGS. 10-18 according to aspects of the embodiments.

FIGS. 28-31 illustrate concave AWG 1004 when isolated from base 210 according to aspects of the embodiments. In particular, FIG. 28 illustrates a top isometric view of concave AWG 1004 isolated from other components of base 210 as shown in FIGS. 10-18 according to aspects of the embodiments; FIG. 29 illustrates a top view of concave AWG 1004 isolated from other components of base 210 as shown in FIGS. 10-18 according to aspects of the embodiments; FIG. 30 illustrates a front view of concave AWG 1004 isolated from other components of base 210 as shown in FIGS. 10-18 according to aspects of the embodiments; and FIG. 31 illustrates a right side view of concave AWG 1004 isolated from other components of base 210 as shown in FIGS. 10-18 according to aspects of the embodiments.

Referring to FIGS. 28 and 29, concave AWG 1004 comprises lower side wall 2802, first portion inner sidewall 2804, inner wall curved portion 2806, second portion inner sidewall 2808, upper side wall 2810, upper acoustic wave interfacing surface of concave acoustic waveguide (concave AWG upper surface) 2812, non-curved exterior side wall portion 2814, curved exterior side wall portion 2816, apex 2818, and substantially planar lower non-acoustic wave interfacing surface 2820.

Figure 32:
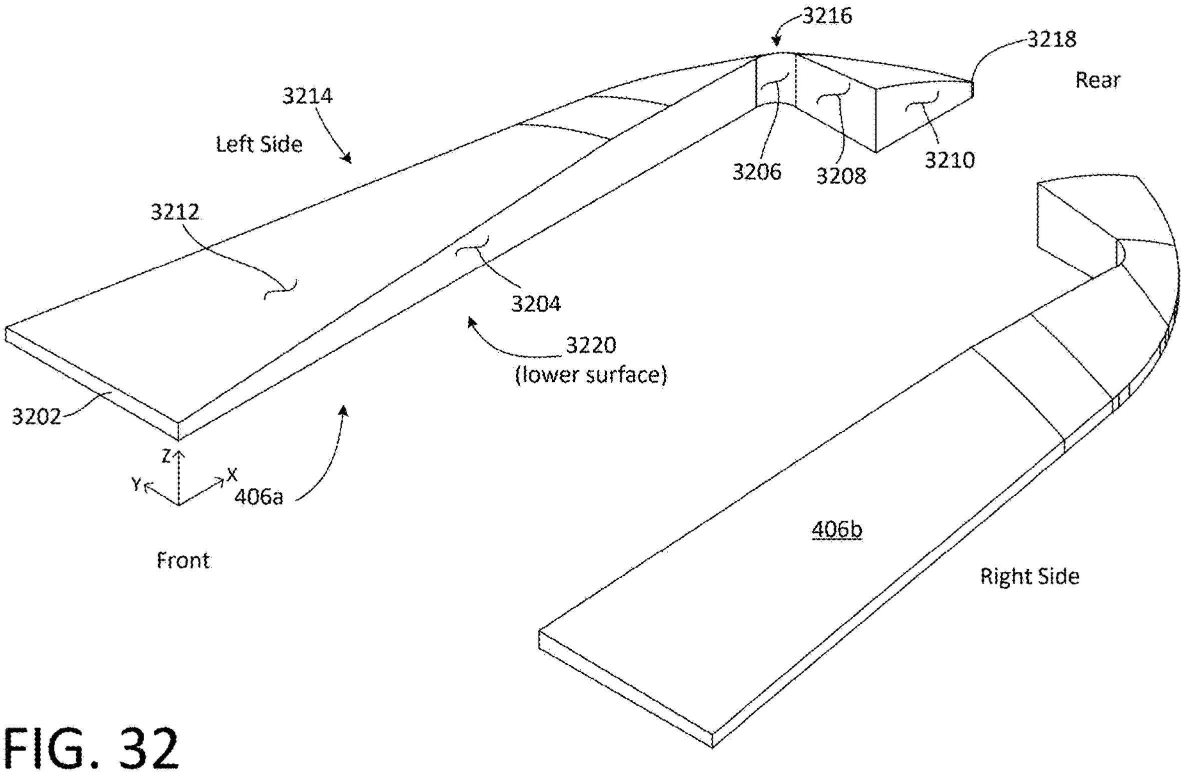
FIG. 32 illustrates a top isometric view of the convex acoustic waveguide isolated from other components of the base piece as shown in FIGS. 19-27 according to aspects of the embodiments.
Figure 33:
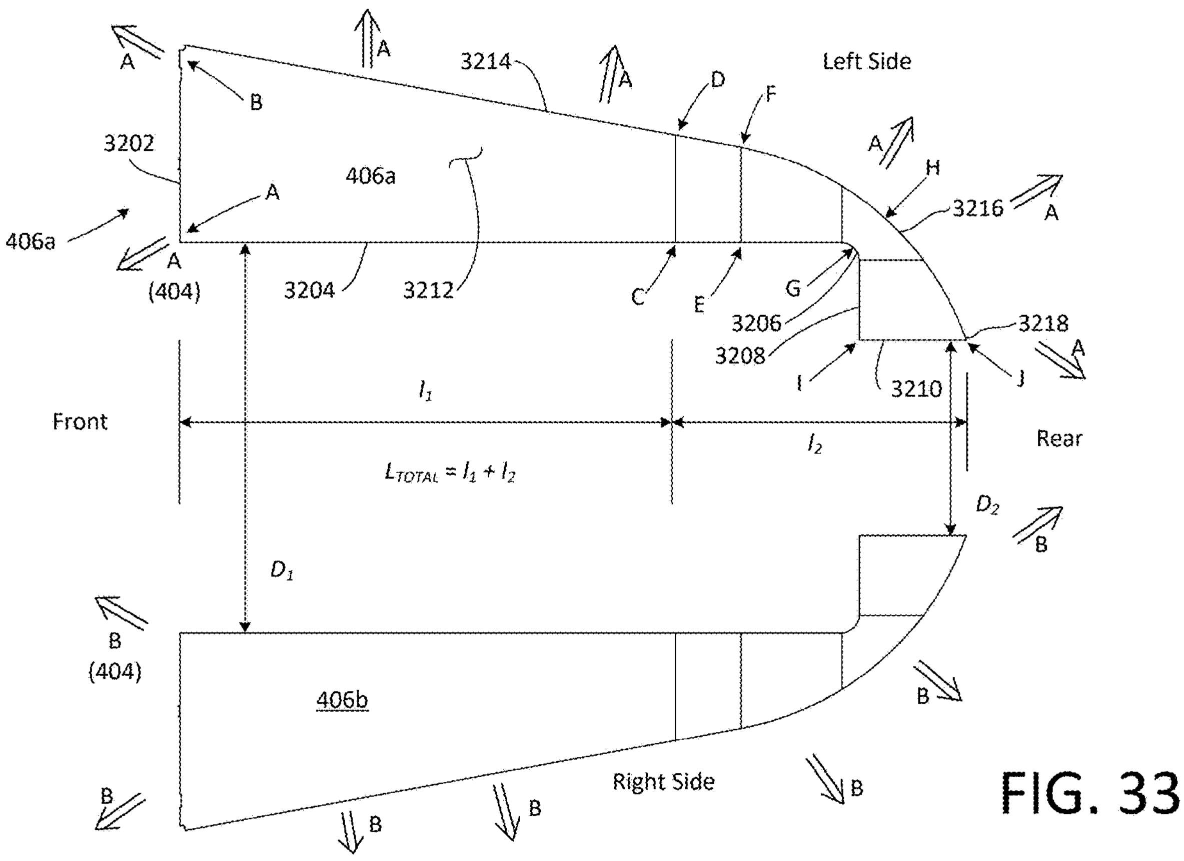
FIG. 33 illustrates a top view of the convex acoustic waveguide isolated from other components of the base piece as shown in FIGS. 19-27 according to aspects of the embodiments.
Figure 34:
FIG. 34 illustrates a front view of the convex acoustic waveguide isolated from other components of the base piece as shown in FIGS. 19-27 according to aspects of the embodiments.
Figure 35:
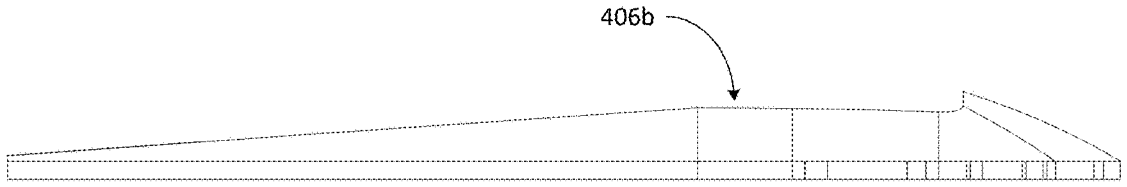
FIG. 35 illustrates a right side view of the convex acoustic waveguide isolated from other components of the base piece as shown in FIGS. 19-27 according to aspects of the embodiments.

FIGS. 32-35 illustrate convex AWG 1004 when isolated from base 1900 according to aspects of the embodiments. In particular, FIG. 32 illustrates a top isometric view of convex AWG 406 isolated from other components of base 1900 as shown in FIGS. 19-27 according to aspects of the embodiments; FIG. 33 illustrates a top view of convex AWG 406 isolated from other components of base 1900 as shown in FIGS. 19-27 according to aspects of the embodiments; FIG. 34 illustrates a front view of convex AWG 406 isolated from other components of base 1900 as shown in FIGS. 19-27 according to aspects of the embodiments; and FIG. 35 illustrates a right side view of convex AWG 406 isolated from other components of base 1900 as shown in FIGS. 19-27 according to aspects of the embodiments.

Referring to FIGS. 32 and 33, convex AWG 406 comprises lower side wall 3202, first portion inner sidewall 3204, inner side wall curved portion 3206, second portion inner sidewall 3208, upper side wall 3210, upper acoustic wave interfacing surface of convex acoustic waveguide (convex AWG upper surface) 3212, non-curved exterior side wall portion 3214, curved exterior side wall portion 3216, apex 3218, and substantially planar lower non-acoustic wave interfacing surface 3220.

Figure 36:
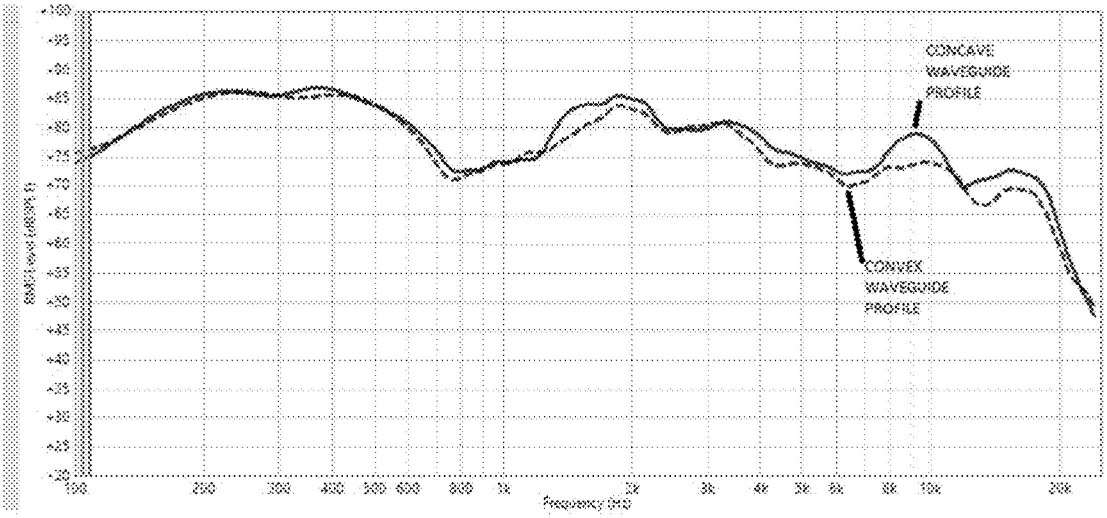
FIG. 36 illustrates a first frequency response (solid line) of a loudspeaker in the audio device shown in FIGS. 1-9 when using the concave acoustic waveguide shown in FIGS. 10-18 according to aspects of the embodiments, and FIG. 36 also illustrates a second frequency response (dashed line) of a loudspeaker in the audio device shown in FIGS. 1-9 when using the convex acoustic waveguide shown in FIGS. 19-27 according to aspects of the embodiments.
Figure 37:
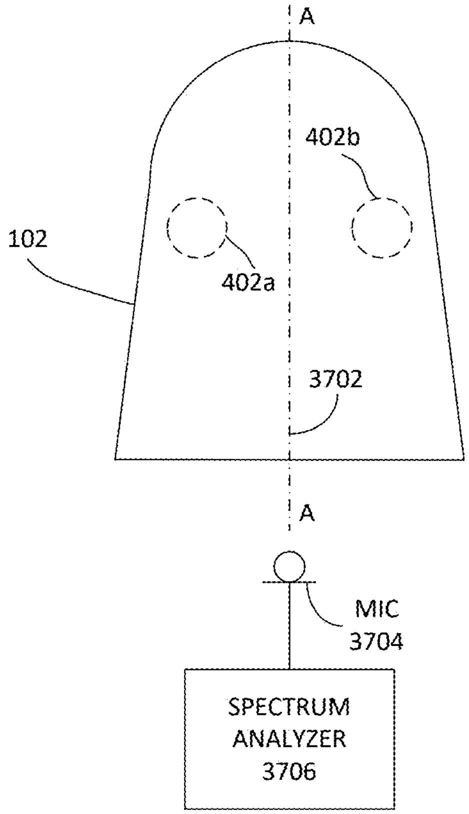
FIG. 37 illustrates a simplified top view of the audio device of FIGS. 1-9 and placement of a spectrum analyzer relative to the audio device to measure a frequency response of the audio device with both a concave acoustic waveguide and a convex acoustic waveguide according to aspects of the embodiments.

FIG. 36 illustrates a first frequency response (solid line) of loudspeaker 402 in audio device 102 shown in FIGS. 1-9 when using concave AWG 1004 shown in FIGS. 10-18 according to aspects of the embodiments, and FIG. 36 also illustrates a second frequency response (dashed line) of loudspeaker 402 in audio device 102 shown in FIGS. 1-9 when using convex AWG shown 406 in FIGS. 19-27 according to aspects of the embodiments. The frequency responses shown in FIG. 36 is substantially similar in all directions about each loudspeaker 402*a, b*, but with these particular measurements, the recording device (microphone 3704 connected to spectrum analyzer 3706) was placed on centerline a-a 3702 of audio device 102, which is a relatively shallow acute angle in regard to both loudspeakers 402*a, b* in FIG. 37 according to aspects of the embodiments. FIG. 37 illustrates a simplified top view of audio device 102 of FIGS. 1-9 and placement of a microphone 3704, which is connected to spectrum analyzer 3706 relative to audio device 102 to measure a frequency response of audio device 102 with both concave AWG 1004 and a convex AWG 406 according to aspects of the embodiments.

Attention is directed to FIGS. 28 and 29, which illustrate a top isometric view and top view of concave AWG 1004*a, b* respectively according to aspects of the embodiments. The views in FIGS. 28 and 29 of concave AWG 1004*a* have been annotated with the letters A-J so that in the following discussion, reference can be made to the physical device and its characteristics that cause it to direct sound waves 404 from loudspeaker 402 (not shown) in a substantially omnidirectional pattern, as shown in FIGS. 8 and 9, among others. Although only concave AWG 1004*a* is so annotated, the discussion that follows, unless otherwise noted, substantially similarly applies to convex AWG 406*a, b* according to aspects of the embodiments.

According to aspects of the embodiments, while many different materials can be used to manufacture either of convex AWG 406 or concave AWG 1004 (collectively referred to as AWG 406, 1004) housing 206, including its lower portion comprising the upper portion of AWGs 406, 1004, whichever material is used must be rigid enough to maintain its shape and avoid vibrations, hard enough to reflect sound waves 404, and minimize absorption sound 404. Some non-limiting example includes both cast metal and injection molded plastic. According to further aspects of the embodiments, the surface should be substantially smooth. As those of skill in the art can appreciate, Ra, or "Roughness Average," is a measurement of a surface's roughness that's calculated by finding the arithmetic mean of the absolute values of surface height deviations from a mean line within a specified evaluation length. According to aspects of the embodiments, the Ra Value for each of AWG 406, 1902 is preferably less but no more than 63 micro-inches, or 1.6 micrometers.

As shown in FIGS. 4 and 5, above, there is a distance H specified between the lower portion of housing 206 and the upper portion of base 210 of audio device 102. That is, the sound generated by loudspeakers 402*a, b* is dispersed through an opening that exists via base grill 208 all around audio devices 102, 114. According to aspects of the embodiments, in order to achieve substantially omnidirectional sound projection from audio device 102, the height H needs to be about 0.4", and can range from about 0.36" to about 0.44", and further can range from about 0.32" to about 0.48". According to further aspects of the embodiments, in order to achieve substantially omnidirectional sound projection from audio device 102, there needs to be at least two loudspeakers 402, but can be as many as four; if audio devices 102, 114 were larger, then the number of loudspeakers 402 could increase proportionally, but there needs to be at least two, substantially symmetrically located about a center axis of audio device 102.

Attention is directed to the embodiment of concave AWG 1004, as shown in regard to FIGS. 1-18, and 28-31. As shown in FIG. 29, concave AWG 1004*a* comprises a generally cuboid shaped object that has a first length $l_1$ defined by the distance from lower side wall 2802 to line C-D, which is the loudspeaker centerline (discussed in greater detail below), and concave AWG 1004 has a second distance $l_2$, defined as the distance from the line C-D to apex 2818, for a total length $L_{TOTAL}$. In addition, as seen in FIGS. 29 and 33, there is a distance between concave AWGs 1004*a, b* of $D_1$ at the lower portion near lower side wall 2802 and a distance $D_2$ between upper side walls 2810*a, b*. Viewed from the top of audio device 102, concave AWG 1004*a* is located on the left side, and a substantially similarly shaped concave AWG portion 1004*b* is located on the right side, but mirrors that of concave AWG 1004*a*. Concave AWG 1004*b* comprises similar portions and dimensions of concave AWG 1004*a*, but it comprises a left turning curved cuboid portion that turns to the left. This can be clearly seen in FIGS. 28-31, among others.

According to aspects of the embodiments, both convex and concave AWGs 406, 1004 are generally shaped like a shepherds hook. Note that in audio device 102, there are a first and second convex AWGs 406, each of which is substantially similar in all respects—height, length, width, configuration, and material from which it is made. According to aspects of the embodiments, curved exterior side wall portion 2816 has a radius of about 3.028", and can range from about 2.725" to about 3.3308", and inner side wall curved portion 2806 has a radius of about 0.25" and can range from about 0.225" to about 0.275". In addition, curved exterior side wall portion 3216 has a radius of about 3.028", and can range from about 2.725" to about 3.3308", and inner side wall curved portion 3206 has a radius of about 0.25" and can range from about 0.225" to about 0.275".

In FIGS. 28 and 29, the surface formed by line A-B decreases slightly from point A to point B; that is, there is a slope in concave AWG upper surface 2812 that faces outward of audio device 102, so that sound waves 404 are pushed outwards in concave AWG 1004—as shown by the direction of arrows A and B in FIG. 29 (arrows A and B illustrates sound waves 404). A substantially similar type of slope is present in the surface represented by the line formed by points A-B in convex AWGs 406*a, b*, as shown in FIGS. 32 and 33, and substantially similarly, sound wave 404 are pushed outwards, as shown by the direction of arrows A and B in FIG. 33.

According to aspects of the embodiments, however, as the upper surface of AWG 406, 1906 transitions along the X-axis as shown in FIGS. 28 and 32, it begins to assume either a concave or convex surface, with a specific radius.

According to aspects of the embodiments, the radii of both AWG 406, 1902 is substantially constant across the width of the upper surfaces 2812, 3212. That is, for concave AWG 1004, the radius of concave AWG upper surface 2812 is substantially constant across concave AWG upper surface 2812—i.e., from points A-B, or points C-D, and so on. Substantially similarly, in regard to convex AWG 406, the radius of convex AWG upper surface 3212 is substantially constant across convex AWG upper surface 3212—i.e., from points A-B, or points C-D, and so on. However, in both of AWG 406, 1004, as discussed herein, the radii of the upper surface does change moving lengthwise, or as shown in FIGS. 28 and 32, in the X direction. That is—in both of AWG 406, 1004, the radius will be different at lines C-D and E-F. In both of AWGs 406, 1004, the radius changes substantially smoothly, meaning there are no abrupt changes in radius moving in the X direction. It is to be noted, that by "X" direction, this is not a straight line as both AWGs 406 and 1004 are in the shape of a shepherds crook, meaning at a farther end—the rear end, there is a curved portion (i.e., from points G-I). According to aspects of the embodiments, the radius of the respective upper surfaces of both convex and concave AWG 406*a, b*, 1004*a, b* changes smoothly and continuously from lines A-B to C-D to E-F, to G-H, to I-J. According to further aspects of the embodiments, the radii of both AWG 406, 1004 is substantially circular. According to further aspects of the embodiments the radii across the upper surfaces 2812, 3212 can be parabolic, or some other non-uniform radius across the upper surfaces 2812, 3212.

Referring to FIG. 30, which is a front view of concave AWG 1004*a, b*, there is shown a height of about 0.498" from point I to substantially planar lower non-acoustic wave interfacing surface 2820, and a height of about 0.416" from point G to substantially planar lower non-acoustic wave interfacing surface 2820. Thus, the upper surface of inner wall/surfaces 2804, 2806, 2808 raises at a first angle from point A to point G, and at a second angle from point G to point I According to aspects of the embodiments, concave AWG upper surface 2812 of concave AWG 1004*a* transitions as it moves in the X direction from a substantially straight line between points A-B to a concave-shaped surface as it reaches a minimum radius at line formed from point G to point H.

Figure 38:
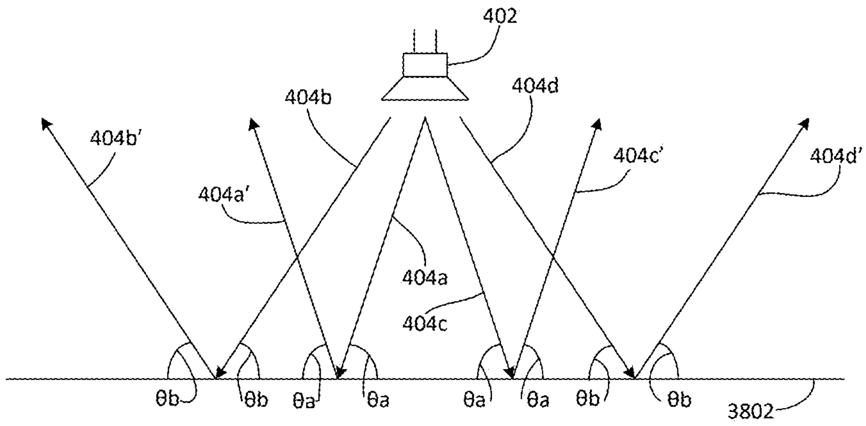
FIG. 38 illustrates a plurality of sound waves transmitted from a loudspeaker and reflecting off a surface at substantially the same angle at which they impact the surface.

As seen in several of the other Figures, line C-D represents a centerline of loudspeaker 402*a*, meaning loudspeaker 402*a* is located directly above line C-D, centered above the line and centered between non-curved exterior side wall portion 2814 and first portion inner side wall 2802. Sound waves 404*a* originate from loudspeaker 402*a* in substantially all directions and encounter concave AWG upper surface 2812. As those of skill in the art can appreciate, sound waves reflect from a surface at substantially the same angle at which they impact the surface: this is shown in FIG. 38. Loudspeaker 402 emits sound waves 404*a-d*, which encounter hypothetical substantially flat surface 3802, and reflect off surface 3802 at substantially the same angle they encounter surface 3802. Thus, referring to FIG. 38, sound waves 404*a, c* encounter surface 3802 at θa, and reflect sound waves 404*a', c'* at θa, and sound waves 404*b, d* encounter surface 3802 at θb and reflect sound waves 404*b', d'* at θb. However, the surface of AWGs 406, 1004 are not substantially flat, except at the very ends (line A-B). If the surface the sound waves reflects off is not substantially flat—i.e., if it is concave, or convex, such as in the aspects of the embodiments, then the angle that the sound wave hits the surface will be slightly different, thereby changing the reflection angle from the simple case of FIG. 38. Further, it is to be noted that the sound waves radiate from loudspeaker 402 in a conical manner, and in a substantially uniform manner within that conical region, and therefore there are innumerable reflections of sound occurring off AWGs 406, 1004. Thus, due to the geometry of the design of AWGs 406, 1004, the innumerable reflections from sound waves directly from loudspeakers 402 and from reflections of reflections from the interior or audio device 102 cause a substantially uniform sound distribution pattern about audio device 102 according to aspects of the embodiments.

As can be seen in the drawing Figures, each of AWG 406, 1004 varies in height and width from one end to the other, as well varying in curvature (for both the concave and convex versions). According to aspects of the embodiments, each of AWG 406, 1004 does not have a uniform height throughout because audio device 102 is not axisymmetric. The direction in which sound waves 404 travel changes depending on the angle between the output of loudspeaker 402 (located along line CD, shown in FIG. 28 for AWG 1004) and any particular location on each of AWG 406, 1004. Around the speaker location (line CD) the height of concave AWG 1004 on an inner side is higher than at line AB, and the sound needs to be reflected at a steeper angle. The sound from loudspeaker 402 travels to the front at a shallower angle, and therefore the surface of concave AWG 1004 is less pronounced. Conversely, sound from loudspeaker 402 is closer in distance to the ends of concave WG 1004 defined by lines GH and IJ, and therefore the angle that the sound encounters those surfaces is greater. According to aspects of the embodiments, in furtherance of generating a substantially uniform sound pattern about audio device 102, the radius of the surface of either AWG 406, 1004 is greatest at line GH, and somewhat less at line IJ, but still larger than at lines EF, CD, and AB, According to aspects of the embodiments, the radius of line CD—right under loudspeaker 402, determines the overall waveguide surface curvature. That is, the other radii are based on the radius of this line.

Figure 39:
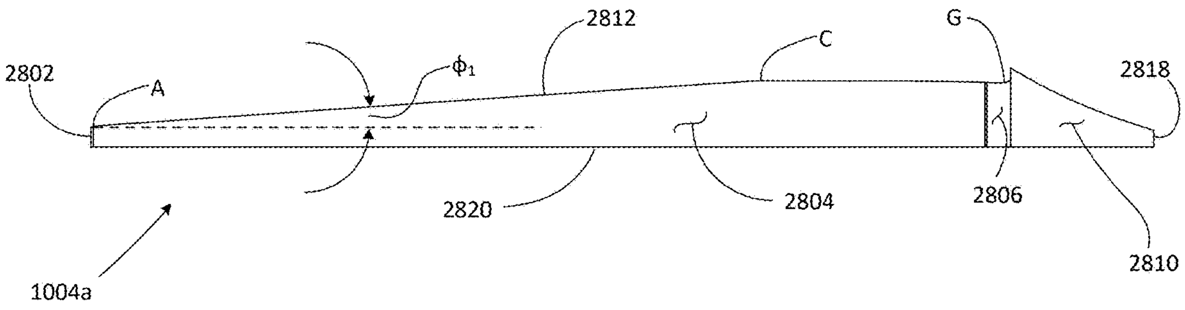
FIG. 39 illustrates a right side view of the concave acoustic waveguide shown in FIGS. 28-31, among others, according to aspects of the embodiments.
Figure 40:
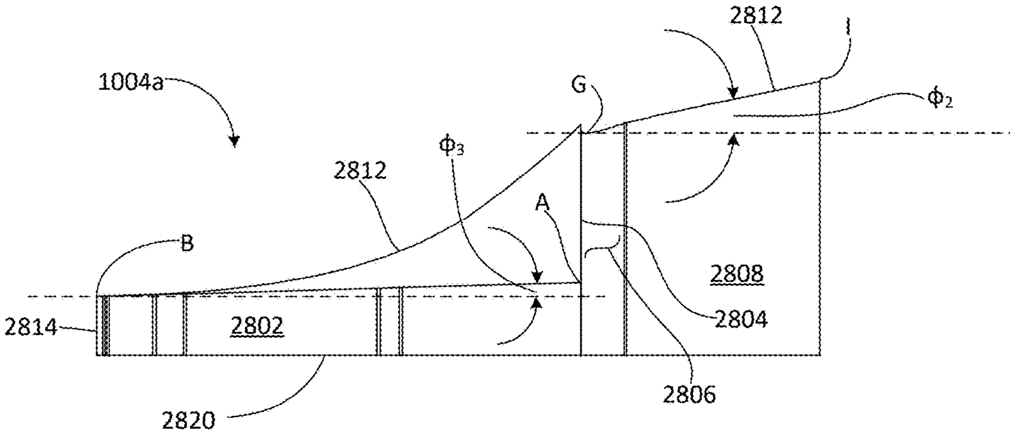
FIG. 40 illustrates a front view of the concave acoustic waveguide shown in FIGS. 28-31, among others, according to aspects of the embodiments.

FIG. 39 illustrates a right side view of concave AWG 1004*a* shown in FIGS. 28-31, among others, according to aspects of the embodiments, and FIG. 40 illustrates a front view of concave AWG 1004*a* shown in FIGS. 28-31, among others, according to aspects of the embodiments. Referring to FIG. 39, angle $\varphi_1$ is formed between the dashed line and concave AWG upper surface 2812, from point A to about point C. The dashed line is a horizontal line formed at point A, which is the uppermost surface of lower side wall 2802. From point C to about point G concave AWG upper surface 2812 is substantially horizontal (flat), although there is still a concave radius in concave AWG upper surface 2812 that is not visible in FIG. 39. Angle $\varphi_1$ is about 4-5° according to aspects of the embodiments.

FIG. 40 illustrates a front view of concave AWG 1004*a* shown in FIGS. 28-31, among others, according to aspects of the embodiments.

Referring to FIG. 40, angle $\varphi_2$ is formed between the dashed line and concave AWG upper surface 2812, from point G to point I. The dashed line is a horizontal line formed at point G, which is the uppermost surface of first portion inner right side wall 2804 (and is also visible in FIG. 39). There is a concave radius in concave AWG upper surface 2812 that is not visible in FIG. 40. Angle $\varphi_2$ is about 4-5° according to aspects of the embodiments. Angle $\varphi_3$ is formed between point A and an imaginary line that is level with point B. Angle $\varphi_3$ illustrates the slope of concave AWG upper surface 2812 of concave AWG 1004, and there is a substantially similarly sloped convex AWG upper surface 3212 of convex AWG 406. Angle $\varphi_3$ is about 1.5° and can range from about 1° to about 2°, and further can range from about 0.8° to about 2.2° according to aspects of the embodiments.

Figure 41A:
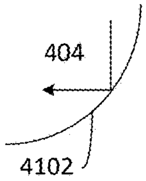
FIG. 41A illustrates a cross sectional view of a concave acoustic waveguide according to aspects of the embodiments.
Figure 41B:
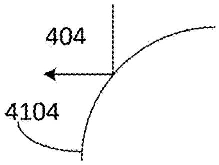
FIG. 41B illustrates a cross sectional view of a convex acoustic waveguide according to aspects of the embodiments.
Figure 41C:
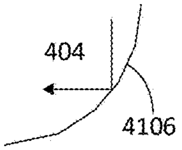
FIG. 41C illustrates a cross sectional view of a segmented concave acoustic waveguide according to aspects of the embodiments.
Figure 41D:
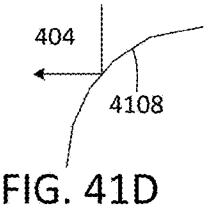
FIG. 41D illustrates a cross sectional view of a segmented convex acoustic waveguide according to aspects of the embodiments.

FIG. 41A illustrates a cross sectional view of concave acoustic waveguide upper surface 4102 according to aspects of the embodiments; FIG. 41B illustrates a cross sectional view of convex acoustic waveguide upper surface 4104 according to aspects of the embodiments; FIG. 41C illustrates a cross sectional view of segmented concave acoustic waveguide upper surface 4106 according to aspects of the embodiments; FIG. 41D illustrates a cross sectional view of segmented convex acoustic waveguide upper surface 4108 according to aspects of the embodiments; and FIG. 41E illustrates a cross sectional view of linear acoustic waveguide upper surface 4110 according to aspects of the embodiments.

Figure 41E:
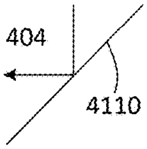
FIG. 41E illustrates a cross sectional view of a linear acoustic waveguide according to aspects of the embodiments.

Each of the cross sectional views shown in FIGS. 41A-E of the upper surfaces of the acoustic waveguides that can be used to distribute sound substantially omnidirectionally about audio device 102 has been exaggerated for clarity. Each of the cross sectional views in FIGS. 41A-E illustrate how sound waves 404 reflect off the surfaces, in greatly simplified views. As described above, and according to aspects of the embodiments, a convex or concave shaped upper surface can be used to achieve substantially similar results in regard to an omnidirectional SPL around or about audio device 102. According to further aspects of the embodiments, the upper surface of the acoustic waveguides can also be a linear surface, as shown in FIG. 41E, with linear acoustic waveguide upper surface 4110. Still further, both of concave acoustic waveguide upper surface 4102 and convex acoustic waveguide upper surface 4104 can be segmented, as shown in FIGS. 41C and 41D, respectively, as segmented concave acoustic waveguide upper surface 4106 and segmented convex acoustic waveguide upper surface 4108, according to aspects of the embodiments. Although as shown in each of the non-limiting examples shown in FIGS. 41C and 41D the segments are of substantially equal lengths, and substantially equally angles, this need not be the case according to aspects of the embodiments. That is, the segments of either or both segmented concave acoustic waveguide upper surface 4106 and segmented convex acoustic waveguide upper surface 4108 could be all different lengths, or some can be the same, and/or different lengths, and likewise, the angles can all be different between the segments, or there can be multiple of the same angles, with the balance different, among other combinations. According to further aspects of the embodiments, the segments can be of different lengths, with different angles.

As discussed in regard to FIGS. 1-41, reference is made to several dimensions, including several radii, angles, height, among others. Those of skill in the art can appreciate that although examples of dimensions are provided, these should not be taken in a limiting manner; that is, the aspects of the embodiments are not to be construed as defined or limited by the specific example of the dimensions shown and discussed, but instead are provided merely for illustrating an example of what a device that incorporates the aspects of the embodiments could, in a non-limiting manner, look like. Furthermore, as those of skill in the art can appreciate, since the aspects of the embodiments are directed towards a physical object, with dimensional characteristics, all of the parts will have various dimensions, some of which are not shown in fulfillment of the dual purposes of clarity and brevity. According to still further aspects of the embodiments, some of these objects will have dimensional characteristics that lend themselves to aesthetic aspects; in fulfillment of the dual purposes of clarity and brevity, dimensions in this regard have also been omitted. Therefore, as the aspects of the embodiments are directed towards systems, software, and one or more methods for broadcasting sound in a substantially circular pattern about audio device 102, 114, such that a SPL measured about audio device 102, 114 is substantially uniform in all directions according to aspects of the embodiments, it is to be understood that the dimensions of the different objects, some dimensions shown, some dimensions not shown, will be understood by those of skill in the art.

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

The disclosed embodiments provide a system, software, and a method for broadcasting sound in a substantially circular pattern about audio device 102, 114, such that a SPL measured about audio device 102, 114 is substantially uniform in all directions according to aspects of the embodiments. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

INDUSTRIAL APPLICABILITY

To solve the aforementioned problems, the aspects of the embodiments are directed towards systems, methods, and modes for broadcasting far end audio that has been received by a near end unified communications system table top combined loudspeaker and microphone device in a substantially omnidirectional pattern.

ALTERNATE EMBODIMENTS

Alternate embodiments may be devised without departing from the spirit or the scope of the different aspects of the embodiments.

What is claimed is:

1. A first acoustic waveguide, for use in a unified communications system conference room audio device, wherein the first acoustic waveguide is a generally shepherds-hook shaped object, comprising:
   - a lower, substantially planar non-acoustic wave interfacing surface;
   - a first portion inner side wall;
   - an inner side wall curved portion;
   - a second portion inner side wall;
   - an upper side wall;
   - a non-curved exterior side wall portion;
   - a curved exterior side wall portion;
   - a lower side wall, and wherein
     - each of the non-curved exterior side wall portion, curved exterior side wall portion, and lower side wall are substantially equal in height;
   - an apex point, located on an exterior surface of the curved exterior side wall portion, and furthest away from the lower side wall;
   - a loudspeaker placement location, located farther away from the lower side wall than from the apex point; and
   - a concave upper acoustic wave interfacing surface, wherein
     - the concave upper acoustic wave interfacing surface comprises a concave shaped surface with a substantially continuously and linearly changing radius, with a substantially horizontal surface at an interface with the lower side wall, and
     - as the concave upper acoustic wave interfacing surface progresses from the lower side wall, the concave upper acoustic wave interfacing surface changes such that the concave radius reaches a maximum first radius at about a center of a curved portion of the shepherds-hook shaped acoustic wave-guide, and then the radius of the concave upper acoustic wave interfacing surface decreases in radius from the maximum first radius at about the center of the curved portion to a second radius at an interface with the upper side wall.

2. The first acoustic waveguide according to claim 1, wherein
   - when used with a substantially similar second acoustic waveguide that is similarly positioned within the unified communications system conference room audio device, but wherein an interior facing side wall of the second acoustic waveguide faces the interior facing side wall of the first acoustic waveguide,
   - the combination of the two acoustic waveguides are adapted to generate a substantially uniform sound pressure level and radiation pattern about the unified communications system conference room audio device when each receive respective acoustic audio waves from respective loudspeakers located at substantially similar heights above the respective acoustic waveguides at their respective loudspeaker placement location.

3. The first acoustic waveguide according to claim 2, wherein
   - each of the respective loudspeaker placement locations are located at a first distance from the lower side wall and a second distance from the apex point, and wherein
   - the first distance is greater than the second distance, and further wherein
     - each respective loudspeaker is located at a first, fixed height above its respective concave upper acoustic wave interfacing surface of the acoustic waveguide.

4. The first acoustic waveguide according to claim 3, wherein
   - each respective loudspeaker is located substantially equidistant between the non-curved exterior side wall portion and the first portion inner side wall.

5. The first acoustic waveguide according to claim 1, wherein
   - a height of the first portion inner side wall increases substantially linearly from a first height at an interface with the lower side wall to a second, maximum height at about a center of a hook portion of the shepherds hook shaped acoustic wave-guide, and further wherein
   - the height of the first portion inner side wall decreases substantially linearly from the maximum, second height to a third height at an interface of the second portion inner side wall with the upper side wall.

6. The first acoustic waveguide according to claim 5, wherein the first acoustic waveguide and the second acoustic waveguide are further adapted to substantially minimize comb filtering between reflected audio waves from each of the first and second acoustic waveguides.

* * * * *